(12) United States Patent
Till

(10) Patent No.: US 11,952,255 B2
(45) Date of Patent: Apr. 9, 2024

(54) FILLING PLANT AND METHOD FOR FILLING BOTTLES AS REQUIRED

(71) Applicant: Volker Till, Hofheim am Taunus (DE)

(72) Inventor: Volker Till, Hofheim am Taunus (DE)

( * ) Notice: Subject to any disclaimer, the term of this patent is extended or adjusted under 35 U.S.C. 154(b) by 392 days.

(21) Appl. No.: 17/431,839

(22) PCT Filed: Feb. 17, 2020

(86) PCT No.: PCT/EP2020/054094
§ 371 (c)(1),
(2) Date: Aug. 18, 2021

(87) PCT Pub. No.: WO2020/169529
PCT Pub. Date: Aug. 27, 2020

(65) Prior Publication Data
US 2022/0411249 A1    Dec. 29, 2022

(30) Foreign Application Priority Data
Feb. 19, 2019 (DE) ..................... 10 2019 104 088.4

(51) Int. Cl.
*B67C 7/00* (2006.01)
*B67C 3/00* (2006.01)
(Continued)

(52) U.S. Cl.
CPC .............. *B67C 7/002* (2013.01); *B67C 3/007* (2013.01); *B67C 3/023* (2013.01); *B67C 3/24* (2013.01); *B67C 2003/2668* (2013.01)

(58) Field of Classification Search
CPC ....... B67C 7/002; B67C 7/0046; B67C 7/004; B67C 7/0053; B67C 3/007; B67C 3/023; B67C 3/24; B67C 2003/2668
See application file for complete search history.

(56) References Cited

U.S. PATENT DOCUMENTS 3,523,604 A    4/1970  Babunovic et al.
6,317,648 B1   11/2001 Sleep et al.
(Continued)

FOREIGN PATENT DOCUMENTS

DE         1811270 A1    8/1969
DE     102010042165 A1    4/2012
(Continued)

OTHER PUBLICATIONS

International Search Report for PCT/EP2020/054094 dated Sep. 10, 2020 (with English translation).
(Continued)

*Primary Examiner* — Timothy L Maust
(74) *Attorney, Agent, or Firm* — Collard & Roe, P.C.

(57) ABSTRACT

A filling plant for handling bottles as required, has at least one bottle handling device, a first supply line which supplies a first bottle type and at least one further supply line which provides a first further bottle type, the first further bottle type differing in shape and/or size from the first bottle type. In order to increase the flexibility, to reduce the inventory and nevertheless to meet the requirements for mass production, the filling plant also has a sorter which is configured to remove bottles selectively and arbitrarily from each of the supply lines, to line up the bottles in a predetermined order on a forward section and to deliver them to the bottle handling device in the predetermined order. The predetermined order can be chosen freely.

14 Claims, 8 Drawing Sheets

(51) Int. Cl.
  *B67C 3/02* (2006.01)
  *B67C 3/24* (2006.01)
  *B67C 3/26* (2006.01)

(56) References Cited

U.S. PATENT DOCUMENTS

| | | | |
|---|---|---|---|
| 10,287,151 | B2 | 5/2019 | Comin et al. |
| 10,870,544 | B2 | 12/2020 | Schulnig et al. |
| 2012/0085071 | A1 | 4/2012 | Hahn et al. |
| 2013/0220481 | A1 | 8/2013 | Hartel et al. |
| 2016/0214799 | A1 | 7/2016 | Walter et al. |
| 2018/0072552 | A1 | 3/2018 | Orndorff et al. |
| 2019/0031380 | A1* | 1/2019 | Hronchek ............... B65B 37/08 |
| 2020/0191193 | A1 | 6/2020 | Schulnig et al. |

FOREIGN PATENT DOCUMENTS

| | | | |
|---|---|---|---|
| DE | 102013218403 | A1 | 3/2015 |
| DE | 102015224972 | A1 * | 6/2017 |
| DE | 102016002244 | A1 | 8/2017 |
| DE | 102017105016 | B3 | 2/2018 |
| DE | 102017105015 | A1 | 9/2018 |
| EP | 0744224 | A1 * | 3/1996 |
| EP | 0775668 | A1 | 5/1997 |
| EP | 0894544 | A2 * | 3/1999 ............ B08B 9/426 |
| EP | 1645340 | A1 | 4/2006 |
| EP | 3178780 | A1 | 6/2017 |
| EP | 3919434 | A1 * | 12/2021 ........... B65G 47/04 |
| JP | H08310653 | A * | 11/1996 ........... B65G 47/847 |
| WO | WO-2006102983 | A2 * | 10/2006 ............. B08B 9/426 |
| WO | 2010017888 | A1 | 2/2010 |
| WO | 2016128089 | A1 | 8/2016 |

OTHER PUBLICATIONS

German Office Action dated Oct. 23, 2019 issued in German priority application DE 10 2019 104 088.4 (with English translation of relevant parts).

* cited by examiner

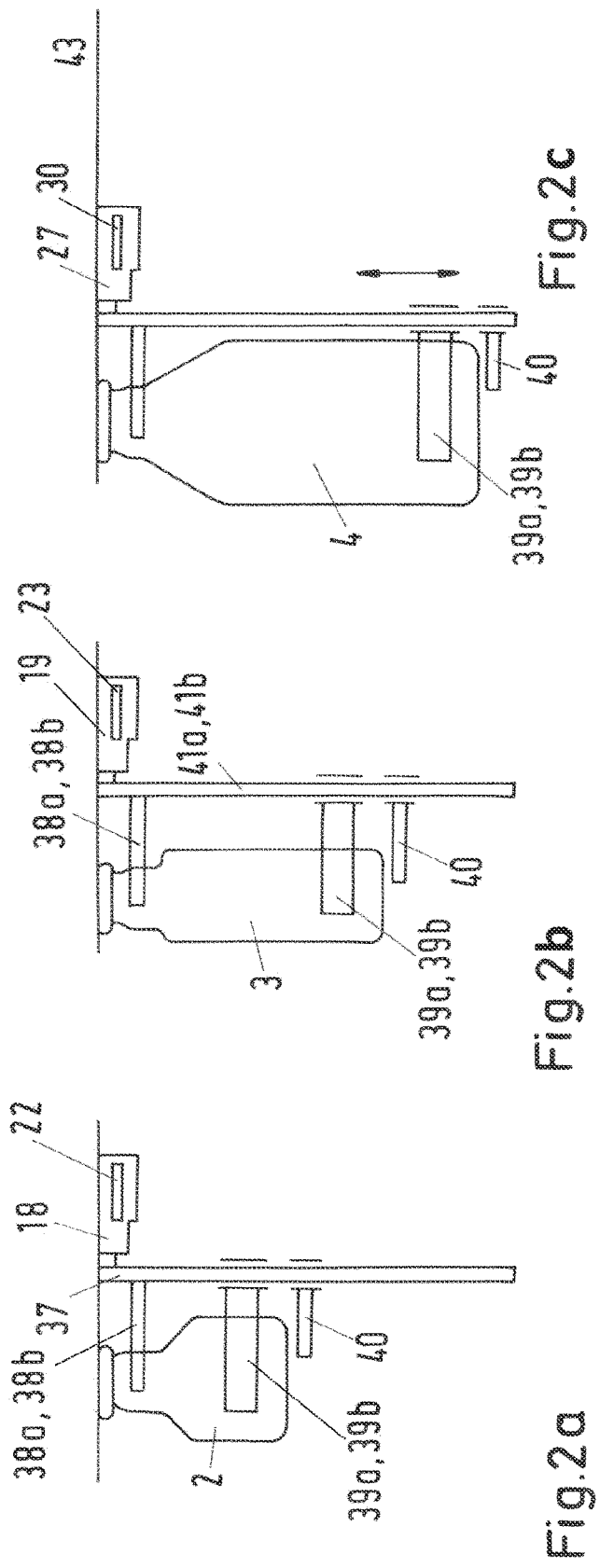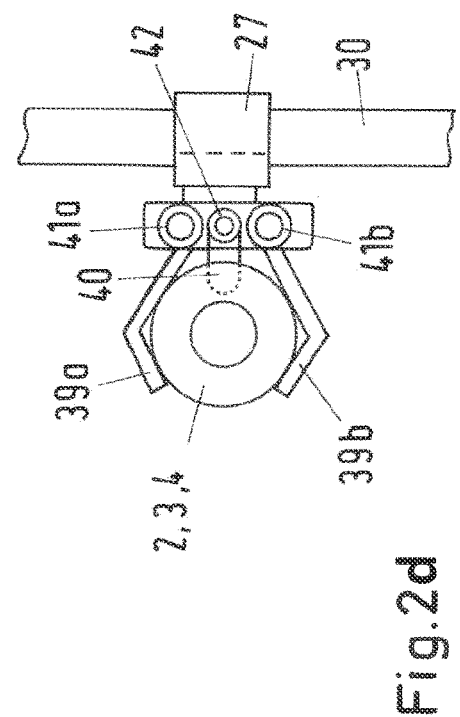

FILLING PLANT AND METHOD FOR FILLING BOTTLES AS REQUIRED

CROSS REFERENCE TO RELATED APPLICATIONS

This application is the National Stage of PCT/EP2020/054094 filed on Feb. 17, 2020, which claims priority under 35 U.S.C. § 119 of German Application No. 10 2019 104 088.4 filed on Feb. 19, 2019, the disclosures of which are incorporated by reference. The international application under PCT article 21(2) was not published in English.

BACKGROUND OF THE INVENTION

The invention relates to a filling plant for treating bottles, having at least one bottle treating device, a first supply line, which supplies a first bottle type, and a further supply line, which supplies a further bottle type, wherein the first further bottle type differs in shape and/or in size from the first bottle type. The invention further relates to a method for feeding bottles into a bottle treating device of a filling plant.

In today's industrialized society, automated filling plants for mass products, in particular beverages, have become indispensable. They generally consist of industrial plants, which can be divided into four sections. First of all, this is the beverage production, which can either relate to a pure beverage, such as, e.g., a beer type, or also mixing beverages, which are made from two or several components in a mixer, which is connected upstream of a filler, in particular a filler carousel. The second section relates to the provision of new or washed empties, thus the bottles. Thirdly, the actual filling process, during which the beverage is filled into the container, the container is closed, and is subsequently decorated in compliance with the law. Fourthly, and lastly, a secondary, tertiary, and final packaging for shipment is applied.

Various bottle types, for example returnable glass bottles, returnable plastic bottles, non-returnable glass bottles, non-returnable plastic bottles, and metal bottles, are used for filling beverages.

The filling plants used today are designed to be able to fill bottles with up to forty units per second in mass production. For this purpose, the plants are adapted to a specific container size and container shape. Containers of the same container type are in each case processed repeatedly. Today, the filling plants, in particular filler carousels, are additionally supplied with an already premixed product, which is to be filled for the moment. This means that for each beverage type, container size and/or container shape, a correspondingly large supply has to be produced in one batch. When production of the batch has finished after a certain time, the filling has to be converted to other container/beverage combinations. Filling plants are large and complex, which is why these conversions can take up to several hours. Depending on the company size and sales volume, an optimal running time can always be calculated for a certain container/beverage combination.

Every time the beverage and/or the bottle type changes, the filling line has to be stopped, generally even altered. This takes time and money and reduces the production capacity. The filling plants and their individual devices are therefore designed for a larger capacity than would be necessary during continuous operation. The downtimes can be balanced, and the required production can nonetheless be attained in this way. However, the devices themselves and the operation thereof become expensive in this way. Moreover, more space is required due to the over-dimensioning. In addition, all of this increases the $CO_2$ equivalent for the filling plants. Lastly, the flexibility for completing different products remains very limited due to the downtimes, which are necessary for the change.

Digital technology is not used in conventional filling plants in order to control production. These filling plants and their individual devices thus operate analogously. The flexibility of the production is also limited in this way.

If, for example, three different packaging sizes, such as bottles of 0.25 l, 0.33 l, and 0.5 l, and, e.g., eight beverage types, such as, e.g., mineral water, Cola, orange soda, sparkling apple juice, lemon-lime soda, beer, as well as mixture of Cola with orange, Cola with lemon, are required, a total of twenty-four different types of products would need to be completed with the filling plant. To avoid numerous alterations and downtimes of the filling plant, the same product is in each case produced, for example, continuously for an entire shift. For an entire shift, only a certain beverage is thus filled into a certain bottle type. One batch of the respective product is produced, for example, during one shift, which lasts eight hours, with a production output of 60,000 products per hour. Twenty-four further shifts thus have to had passed before production of this next batch of the same product has finished.

A stock should be so large that the sales volume with the corresponding product is sufficient for a minimum running time until the next production batch of this container/beverage combination. In this example, the production of twenty-four shifts has to be thus stored in warehouses, in order to ensure that each product is continuously available. It must thus be possible to store up to 24*8*60,000=11,520.000 filled bottles. If twenty filled bottles are housed in a plastic crate, up to 576,000 plastic crates are therefore required.

On average, between 3% and 5% of the annual production are stored in so-called full goods warehouses. This ties up large sums of capital in the form of the stored full goods products. These can be several millions of filled bottles, hundreds of thousands of plastic crates, and tens of thousands of pallets.

It is obvious that this is associated with a significant capital tie-up in the warehouse. In general, not all deliveries furthermore consist of a complete pallet. Manual re-sorting for, e.g., half pallets, is thus indispensable and leads to high additional costs. In addition, long distances have to be covered in the warehouse in order to load delivery trucks due to the large required storage area, whereby in particular the number of the required forklifts, the stopping and waiting times of the trucks for loading and thus the logistics costs are increased. A correspondingly large number of forklifts is required.

The areas for warehouse buildings for the beverage industry thus generally far exceed the areas, which are needed for the beverage production and filling/packaging. This is to be avoided, in particular from ecopolitical aspects of reducing the area requirement. Over-stored articles have to furthermore be disposed of time and again, because the demand had not been assumed correctly in the forecast.

The areas of the full goods warehouses are enormously large and cannot be used for other purposes. Moreover, the full goods warehouses have to be heated in the winter. It is particularly noteworthy that the complex warehousing is also associated with a high $CO_2$ equivalent. All of this leads to high costs and to large amounts of tied-down capital.

The buyers of the products generally order different products at the same time. They expect that different products will be delivered to them in one shipment of goods. Due to the above-described production and full goods warehousing, the individual shipments of goods can only be put together or picked, respectively, at the very end, as required. To prepare the shipment of goods, the ordered number has to be removed from the corresponding storage area separately for each product. Moreover, the different products have to be put together and prepared for the shipment. This requires additional operating steps and increases the costs. The $CO_2$ equivalent is also increased thereby. Moreover, an additional error source results from the subsequent putting together of the products.

Even though it is known to fill several bottle types and different beverage types for special fillings on a small plant with approx. 100 containers per hour, a system operating in cycles is required thus far for this purpose for glass bottles with three sizes, which, with articulated arm robots, does not meet the performance requirements of the beverage industry for the mass production, but can only produce special mixtures for special orders. A single-digit filling rack is therefore used as filler.

The same is likewise known for plastic bottles, wherein PET beverage bottles of one size are mixed on a filling rack. However, the known systems are not intended and are not suitable for treating different bottle types, such as glass and/or PET bottles.

SUMMARY OF THE INVENTION

It is thus the object of the invention to provide a filling plant, which meets the requirements on the mass production, but which avoids an extensive warehousing, and which increases the flexibility.

According to the invention, the object is solved by means of a filling plant according to claim 1.

The filling plant according to the invention for treating bottles as required has:
  at least one bottle treating device;
  a first supply line, which supplies a first bottle type;
  at least one further supply line, which supplies a first further bottle type, wherein the first further bottle type differs in shape and/or in size from the first bottle type; and
  a sorter, which is configured to remove bottles arbitrary selectively (i.e. selectively at will) from each of the supply lines, and to line up the bottles arranged in a predetermined order on an infeed section, and to feed them to the bottle handline device in the predetermined order, wherein the predetermined order can be chosen freely.

The predetermined order can in particular be selected freely independently of the bottle type.

In the production process, different bottle types can thus be handled in the bottle treating device in any desired proportion to one another. The bottle types can comprise, for example, non-returnable plastic bottles, returnable plastic bottles, non-returnable glass bottles, returnable glass bottles, and/or metal bottles, in each case of different shape and/or size.

Moreover, this proportion can be changed arbitrarily at any time and without production interruption. The filling plant can in particular be configured to handle
  only bottles of the first bottle type
  only bottles of the second bottle type or
  arbitrary shares of both bottle types at the same time in the bottle treating device so as to be capable of being changed arbitrarily during ongoing operation (in each case for a period of time).

Along a production direction, the bottle treating device can be the first bottle treating device downstream from the sorter.

A "bottle treating device" in terms of this disclosure can in particular be:
  a cleaning device for bottles, for example a rinser;
  a decorating system for decorating bottles, for example a printing device and/or a labeling device;
  a filling device for filling bottles, for example a filler carousel;
  a closing device for closing bottles;
  a pasteurizing device, for example a tunnel pasteurizer;
  a final packaging device; and/or
  a palletizer;

In the following, the word "product" can refer to a ready-to-sell, filled bottle. In particular, a "product" can be a filled, closed, decorated, and if necessary, pasteurized bottle.

With the present invention, the required storage areas can be drastically smaller. The warehouse or the warehouses for the finished products thus no longer need to be designed for the start-up of the production of, e.g., up to 24 shifts (in the case of three different bottle types and eight different beverage types). The space, which is necessary due to the production in different batches based on the different bottle shapes, can largely be saved. Conversion times and downtimes caused thereby based on the filling into different bottle types are furthermore eliminated. The warehouse capacities, which need to be kept available for this purpose, are obsolete as well.

Moreover, the maximum capacity of the filling plant can be smaller. Smaller motors, smaller tanks, and smaller pumps can therefore be used. This lowers the investment costs for the filling plant, the energy consumption thereof, and therefore the $CO_2$ emission caused by it, the space requirement thereof, and the maintenance and replacement part costs required for it.

The freed-up areas can be used for other purposes. Moreover, less storage space has to be heated in the winter and/or has to be cooled in the summer. This provides for a significant reduction of the costs. Moreover, forklift routes are shortened, and fewer employees are required for the warehouse operation.

Due to the fact that, as a whole, fewer finished products have to be stored, the capital tie-up for the filling company decreases significantly. Less capital in the form of bottles, crates, pallets, and bottle contents in the warehouses is tied up.

Moreover, significantly less $CO_2$ is released due to the savings of heating and/or cooling energy. The invention therefore provides for a reduction of the $CO_2$ emission for a filling operation. According to an estimation, the $CO_2$ emission can be reduced by 15% to 20%, depending on the capacity of a conventional filling plant with similar total production and corresponding warehousing. In light of the discussions about a climate crisis, the consumer will incorporate this as significant argument in his purchase decision. Moreover, costs for $CO_2$ certificates can be saved in some countries.

Moreover, the reduced warehousing has the result that the products tend to be stored for a shorter time. The products are fresher when they reach the end consumer. In addition, the risk of an over-storing of the products due to changing demand or due to changing order quantities, respectively, sinks.

Finally, the customers' desires for different bottle types and the desired shares thereof in individual deliveries can be responded to more quickly and more flexibly.

According to the invention, different bottle types can thus be processed at the same time in a production process in mixed mode operation, in order to then have an order of packages at the end of the production line, which cannot only be loaded onto the truck immediately, but can also be loaded in such a way that a later smooth unloading can take place.

Half packaging units can likewise be filled with the same bottle type of a different product, which is to likewise be delivered.

The sorter can interact with all required supply lines and can line up the corresponding bottles on the infeed section. The infeed section is arranged and configured, for example, in such a way that the bottles can be fed from the infeed section to individual treating positions of the bottle treating device (e.g. filling positions of a filler carousel) in the predetermined order. The bottles thereby do not necessarily have to be transferred to the bottle treating device in adjacent treating positions (e.g. filling positions of a filler carousel), but it is possible.

According to an advantageous aspect of the invention, the feeding of the bottles into the bottle treating device does not take place via star. The feeding of the bottles into the bottle treating device can take place directly by means of the sorter, for example by means of individual movers of the sorter. The individual movers can move on one or several loops. The movers can in particular selectively collect the bottles at a respective one of the supply lines. Bottles of different bottle types can thus be moved in completely arbitrary order in mixed mode operation. Different bottle types can in particular move independently of one another as a function of the internal requirement or directly according to order, and can be sorted arbitrarily.

In a preferred embodiment of the filling plant, the sorter has several movers, which are driven independently and individually, in particular by means of a servo motor. The movers can be embodied, for example, as carriages. This means that the individual movers, and thus the individual bottles transported in the movers, can be moved completely independently of one another.

The movers can be movable in particular on a rail. Then, the sorter therefore also has a corresponding rail, which is arranged at supply lines, infeed section, and/or the bottle treating device (e.g. the filler carousel), so that the movers can approach the respective positions. For example, the XTS system from Beckhoff or a comparable system from BuR can be used for this purpose. More generally, the sorter can comprise a rail system comprising one or several rails, on which the movers can be moved independently and individually.

In an advantageous further development, the mover has a gripper for receiving and holding a bottle. Said gripper is configured to remove a bottle from the supply lines and/or to feed the bottles into the bottle treating device (e.g. into the filler carousel). The gripper can thereby be controlled in such a way that it opens or closes, respectively, in each case at a transfer point between mover and supply line and/or the bottle treating device (e.g. the filler carousel), in order to release or receive the bottle, respectively. The controlling can take place actively, i.e. with a movement, which is controlled by means of an actuator, for example a servo motor, or passively, for example by means of a cam disk. By means of the movers, which are equipped with grippers, the individual bottles can be moved particularly quickly and accurately, so that high throughputs can be attained, as they are necessary for the mass production, in spite of the individual processing of the individual bottle.

In a particular preferred embodiment of the filling plant, the sorter has a first unmixed rail region, which is arranged at the first supply line and which is assigned to the latter, and a second unmixed rail region, which is arranged at the second supply line and which is assigned to the latter, in such a way that a mover can take over the bottles from the respective supply line in the respective rail region.

In the case of more than two bottle types, more than two unmixed rail regions can be provided. In each case, one unmixed rail region is in particular provided for each supply line and thus for each bottle type. An unmixed rail region is a rail section, in which only bottles of a single type are transported by means of the individual movers.

In contrast, a mixed rail region is a rail region, on which bottles of different bottle types are transported. In the unmixed rail region, the bottles can thus be taken over from the supply line, without colliding with the take-over of the other bottle types. An independent botte take-over is thus possible, whereby it is possible without any problems to operate the filling plant purely with the first bottle type, purely with the second bottle type, or with every arbitrary share of the different bottle types.

In a particularly preferred embodiment of the filling plant, the infeed section likewise has a rail region, in particular a mixed rail region, which is connected to the respective unmixed rail regions via at least one switch, so that the mover can change from the respective unmixed rail region to the infeed section via the switch, wherein the mixed rail region of the infeed section meshes with the bottle treating device (e.g. with the filler carousel) at least in a subregion, in which the bottles are transferred to the bottle treating device (for example to individual treating positions, in particular, e.g., to filling positions of the filler carousel). It is thus possible to transport the individual bottles from the supply lines all the way to the bottle treating device (e.g. to the filler carousel) by means of a single mover, which thus has to grip the bottle only once. A safe and accurate transport is thus ensured.

In a particularly preferred embodiment of the filler plant, the first mover has a gripper, which is firmly adapted to the first bottle type, and a second mover, which differs from the first mover, has a gripper, which is firmly adapted to the second bottle type. Due to the individual adaptation of the movers to a bottle type, an adjusting mechanism at the movers is eliminated. The movers are thus significantly more fail-safe, more stable, and maintenance costs can be saved. Instead of an adjusting mechanism, different movers are thus provided, which are in each case adapted to the different bottle types. The different bottles are thus in each case transported by a mover, which is adapted specifically to the respective bottle type. For each bottle type, the filling plant can in each case in particular have one or several movers, which have a gripper, which is adapted to the respective bottle type.

In the unmixed rail region, a mover that is firmly adapted to a bottle type can thus take over a bottle from the supply line and can move to the mixed rail region via a switch. There, it is enqueued at the corresponding spot between the movers of other bottle types with corresponding bottles. After a transfer of the bottle to the bottle treating device (for example the filler carousel), the empty mover moves back into the same unmixed rail region of the bottle type, to which it is adapted, via a switch, in particular a second switch. There, it can wait on a buffer section or a waiting area, until a further bottle of this bottle type is required. So many movers, which are adapted to a bottle type, are in particular provided that the filling plant can also be operated purely with this bottle type. The buffer section or waiting area is thus embodied to be so large that there is room for all movers of this type, when no bottles of this bottle type are to be filled just then.

In a particularly preferred embodiment of the filling plant, the mixed rail region has a rail, which is closed. The movers can thus move circumferentially on the rail, whereby the control of the movers is simplified significantly. In particular, it is also possible that simultaneously with the botte feed, a bottle removal takes place on the same section. For example, an empty mover can thus be moved to the bottle treating device (e.g. the filler carousel), and, instead of transferring a bottle, can take over a bottle, which is already located in the bottle treating device (e.g. in the filler carousel), and which is not to be released at the normal removal mechanism, for example due to a defect or error. The bottle can then be guided back, for example, to the corresponding unmixed rail region, in order to be removed there from the supply line or another unit provided for this purpose.

In a particularly preferred embodiment of the filling plant, the infeed section has a linear conveyor as well as a mixed rail region. As mentioned above, the mixed rail region is a rail region, on which several bottle types are transported at the same time. The first and the second unmixed rail region are arranged at the linear conveyor in such a way that a mover can transfer the bottles from the unmixed rail regions to the linear conveyor. The linear conveyor is thus used to create the bottle order, in which the bottles are to later be placed onto the bottle treating device (for example the filler carousel), in order to initially transfer the bottles to the closed rail system for bottles of different bottle types in this order. The movers for bottles of different bottle types then do not operate in an unmixed manner and can have an automated conversion for adaptation to the next arriving bottle.

The mixed rail region is likewise arranged at the linear conveyor for taking over the bottles, wherein the mixed rail region meshes with the bottle treating device (e.g. the filler carouse) at least in a subregion, in which the bottles are transferred to the bottle treating device (e.g. the filler carouse). Due to the combination of different movers on rail regions comprising a linear conveyor, the advantages of the cost-efficient transport of the bottles can be combined with the variability of the movers. In particular, no switches are required due to the arrangement, whereby the individual movers are moved on a single circumferential paths and are thus very fail-safe.

In a particularly preferred embodiment of the filling plant, the filling plant (for example the sorter) comprises universal movers for different bottle types. For example, universal movers can be arranged on the mixed rail region. The universal movers can in each case have a gripper, which can be dynamically adapted to the first bottle type as well as the second bottle type, or at least essentially to all provided botte types, respectively. Particularly preferably, the universal movers are configured to be adapted automatically, for example by means of a cam disk or by means of a servo motor, to the next bottle, which is to be taken over, prior to the take-over of a bottle.

For this purpose, a buffer section, in which the mover can adapt its grippers to the next bottle, can be provided downstream from a transfer position between mixed rail region and the bottle treating device (e.g. the filler carousel), in which the mover transfers the bottle to one of the treating positions (e.g. one of the filling positions). In particular in the case of a very large number of different bottle types, it can be advantageous not to store as many movers for each bottle type, as would be required for the pure operation with this bottle type. Due to the universal movers, the total number of the movers and thus the costs for the filling plant, in particular in the case of a very large number of different bottle types, can thus be reduced.

It is also possible that the filling plant has movers for one bottle type or several bottle types in each case, which are firmly adapted to the respective bottle type, and additionally has universal movers. The advantages of the two approaches are thus combined. For example, respectively adapted movers can be used for bottle types, which are to be processed particularly frequently, in order to increase the failure safety. On the other hand, the filling plant comprising the universal movers can also process unusual bottle types, for example for special requests by the customers. If more unusual bottle types are not processed, the universal movers can also be used for the more common bottle types.

In a particularly preferred embodiment of the filling plant, the grippers of the movers are arranged in such a way that all bottle types are moved flush with the opening. An adaption of the bottle height in the bottle treating device (e.g. in the filler carousel) is thus eliminated, for example in the filler carousel by means of a height displacement of the bottle or of a filling outlet provided in the filling position. In the case of plastic bottles comprising neck ring, the flushness with the floor is at hand anyway and is sensible. The first supply line and the second supply line can also be height-adapted to one another in such a way that the bottles are already supplied flush with the floor.

In a particularly preferred embodiment of the filling plant, the grippers of the movers are arranged in such a way that all bottle types are moved flush with the floor. In particular in combination with the use of a linear conveyor in the infeed section, which typically transports the bottles flush with the floor, it is advantageous to also configure the grippers for transport flush with the floor.

In a particularly preferred embodiment of the filling plant, the gripper has first gripper tongs comprising two opposing gripper arms, which can be moved towards one another for closing the gripper, in particular synchronously. To open the gripper, the gripper arms of the gripper tongs move away from one another accordingly. The gripper arms can have, for example, V-shaped hands, whereby all bottles are centered on the same center in response to synchronous movement.

In a particularly preferred embodiment of the filling plant, the gripper has second height-adjustable gripper tongs, which are arranged above or below the first gripper tongs. The second gripper tongs can be constructed in the same way as the first gripper tongs. Extremely preferably, the second gripper tongs are also driven by means of a drive for opening and closing the first gripper tongs, in particular by means of a spline shaft. Upper and lower gripper tongs thus move synchronously, whereby the bottles are held securely during the gripping process.

In a particularly preferred embodiment of the filling plant, the first and/or the second gripper tongs are embodied in a spring-loaded manner. Slight tolerances of the bottles or of the gripper tongs positions can thus be compensated, whereby for instance a wedging of the bottle is prevented.

In a particularly preferred embodiment of the filling plant, the gripper has a platform for the bottle. A weight of the bottle thus does not have to be carried solely by frictional forces during the clamping of the bottles at the gripper arms, but the bottle is supported from below by means of the platform. A secure support is thus ensured in particular in the case of heavy glass bottles.

The platform is preferably height-adjustable, whereby the gripper can be adapted to different bottle sizes and shapes in a simple manner. The height adjustability of the platform in particular makes it easier to guide different types of glass bottles flush with the floor in the same movers. In addition or in the alternative, it also facilitates the transfer of bottles, which are fed flush with the floor from supply lines, but which are fed with different floor levels due to different bottle heights. This is relevant, in particular when different types of glass bottles with different bottle heights are fed flush with the floor. The height adjustability of the platform further makes it easier that the platforms can mesh with height-adjustable base plates of the bottle treating device.

However, in particular only a small subregion of the bottle base is covered, for example, by means of the platform. This is possible, because the bottle is secured against tipping over not solely by means of the platform, but also by means of the gripper arms. The gripper can be fastened to the carriage in such a way that the carriage is arranged essentially at the opening height of a held bottle. If a bottle breaks, the shards then do not fall onto or into the transport means and can thus not block the operation.

The number of the supply lines can be adapted arbitrarily, in particular to the number of the different bottle types, which are to be processed.

In a particularly advantageous embodiment, the filling plant additionally has at least one second, further supply line (thus a total of at least one first supply line, a second supply line, and a third supply line). This allows for a further flexibilization of the production.

In general, an arbitrary number of further supply lines can be provided. Particularly preferably, all supply lines are unmixed. Unmixed supply lines are particularly reliable. The flexibility of the composition of the different bottle types is made possible by means of the sorter.

In a further development of the invention, all further bottle types differ from the first bottle type. In particular, all further bottle types can in each case also differ from one another. In an exceptionally preferred manner, the filling plant thus in each case comprises at least one unmixed supply line for each bottle type of a plurality of different bottle types. For example, N unmixed supply lines N can be provided for different bottle types, wherein N is an integer greater than or equal to two.

If the filling plant has, for example, three unmixed supply lines for three different bottle types, it can be configured to handle
  only bottles of the first bottle type,
  only bottles of the second bottle type,
  only bottles of the third bottle type,
  arbitrary shares of the first and second bottle type at the same time,
  arbitrary shares of the first and third bottle type at the same time,
  arbitrary shares of the second and third bottle type at the same time, or
  arbitrary shares of the first, second, and third bottle type at the same time in the bottle treating device so as to be capable of being changed arbitrarily during ongoing operation (for a period of time). The order of the individual bottles one behind the other is thereby in each case arbitrary.

It is also possible to provide more than one supply line for a bottle type, in particular to increase the throughput for this bottle type, or to be able to be used as reserve in the case of a possible defect. A total of at least three supply lines thus needs to be available in this case, for example two supply lines for the first bottle type, and at least one further supply line for the first further bottle type, which differs from the first bottle type.

The supply lines can have, for example, conveyors, in particular linear conveyors, which feed the respective bottle type in an unmixed manner, for example from a corresponding warehouse or directly from a production unit, to the sorter. In the case of several bottle types, several such transport systems are thus arranged parallel to one another. In the alternative, the systems can be arranged one behind the other or in a mixed setup arranged in parallel and one behind the other. It is thus possible to fill different bottles in arbitrary order (and optionally also with different products, which will be described below), and to thus avoid the disadvantages caused by a warehousing.

A respective supply line can thus have a linear conveyor. Linear conveyors are preferably used to feed glass bottles, because glass bottles do not have a neck ring in many cases.

In the alternative or in addition, a respective supply line can have an air conveyor. This is advantageous in particular when feeding plastic bottles. Empty plastic bottles are generally fed while hanging on their neck ring.

According to a further preferred aspect, all bottle types are fed to the sorter flush with the opening. To date, empty plastic bottles are generally fed flush with the opening anyways, because they are transported on their neck ring. To date, however, glass bottles are fed flush with the floor for the most part. However, the feeding flush with the opening facilitates the setup and the operation of the sorter.

It is assumed that unmixed supply lines for the feeding flush with the floor exist in each case for different bottle types, in particular for different types of glass bottles. This means that in these supply lines, the bottles are in each case fed while standing on their base. These different supply lines can then have different base levels, at least at their respective transfer region to the sorter. It is thus possible that the different bottle types are fed to the sorter flush with the opening in spite of different bottle heights.

According to a preferred aspect, a height of the supply of the bottles for the sorter can be adjusted for at least one of the supply lines. Particularly preferably, this applies for several or all of the supply lines. In particular, such a supply line can be configured such that a transport height can be adapted or is adapted, respectively, as a function of an opening shape, shape and/or height of the supplied bottle type. For example, the conveyor and/or air conveyor can be height-adjustable for such a supply line, at least in an end region (at the sorter). This is advantageous when the assortment of the bottle types is converted. This makes the filling plant even more flexible.

For example, the same conveyor can be used one after the other to feed different types of glass bottles with different bottle heights. The different glass bottles are floor-guided in spite of their different bottle heights, and are nonetheless fed to the sorter flush with the opening. For this purpose, glass bottles of a first bottle type with a first, larger bottle height, are for example initially fed to the sorter in a floor-guided manner by means of this conveyor. The height of the supply of the conveyor to the sorter is then moved further to the top. Glass bottles of a second bottle type with a second, lower bottle height are then fed to the sorter in a floor-guided manner. Due to the fact that the height of the supply is adapted to the second bottle height, the glass bottles of the second bottle type are fed with the same height of the bottle opening as the glass bottles of the first bottle type.

The above-mentioned embodiments relating to the height adjustability are further a proven method for providing flushness with the opening even for different bottle types, in particular also for glass bottles.

According to a further preferred aspect, all bottle types are fed to the sorter flush with the floor. To date, empty glass bottles are generally fed flush with the floor anyways. For example, the feeding flush with the floor lends itself in particular when the bottles are guided flush with the floor in the sorter.

Arbitrary different or identical configurations are therefore possible for the different supply lines.

The predetermined order is a sequence of bottles. The bottles can be of different bottle types in any way. The predetermined order can in particular be stored in a control unit of the sorter. It can be generated for a certain order, thus optionally also a concrete delivery.

The filling plant preferably comprises a control system, which is configured to determine the predetermined order.

Particularly preferably, the predetermined order is determined (for example in an automated manner by means of the control system) based on a freely-selectable outlet order, in which the bottles (or the products, respectively), the treating of which has finished, are to leave the filling plant. The outlet order can in particular be that order, in which the products leave the last bottle treating device of the filling plant. This allows for an "on-the-fly" and/or "on-demand" production directly in the desired outlet order.

In the alternative or additionally, the control system is configured to determine the predetermined order in an automated manner from a production order and/or several production orders.

According to an advantageous aspect of the invention, the filling plant is preferably configured so that a supply of the products, the picking of which has finished, takes place. For example, the products can be dispensed from the filling plant in a corresponding outlet order. The supply, the picking of which has finished, can in particular be designed for the direct loading of one or several transport units for transporting the products. A transport unit can be, for example, a truck, a truck trailer, a truck semi-trailer, a pick-up truck, a container, a railcar, a ship, or the like.

The control system can in particular be configured to determine the predetermined order in an automated manner on the basis of one or several orders. The order can be sorted, for example, according to incoming order. Particularly preferably, however, it is created in such a way that an unloading of the truck (or more generally, of the transport unit, respectively) at the end customer or at the end customers, respectively, is considered. For this purpose, the product, which is to be removed first, is thus filled last, and is thus also placed onto the truck last, the product, which is to be removed last, is therefore logically filled first and can thus also be placed onto the truck first.

The filling plant can thus be configured to complete and to discharge the products (preferably automatically) in an outlet order, which corresponds to a reversal of an arbitrarily specifiable unloading order.

In a further development, the control system is configured to consider different treatment durations for different bottles in the filling plant when determining the predetermined order. The control system can in particular be configured to consider individual total treatment durations for different bottles (or products, respectively) in the filling plant downstream from the sorter when determining the predetermined order.

In general, different, individual (total) treatment durations result for different bottles or products, respectively, for example determined by means of different treating orders and/or treating processes.

For example, the filling of a bottle of a larger bottle type can take up more time than the filling of a bottle of a smaller bottle type. In this case, the treatment duration depends on the bottle type, in particular on a filling volume. A filling duration can also depend on the beverage. For example, a filling must tendentially take place more slowly when a beverage has a very high foaming tendency.

Analogously, the treatment duration can be different individually for different bottles in a decoration system of the filling plant, for example in a digital printing device. The required treating time can depend, for example, on the print density, the bottle type (in particular on its size) and/or on the colors.

The freely selectable outlet order is thus even ensured or attained, respectively, when treatment durations for different bottles are different, in particular downstream from the sorter.

The total treatment duration of a bottle can be the individual time, which the filling plant (likely) requires until the discharge of the corresponding finished product (e.g. decorated, filled, closed, and optionally pasteurized bottle) with the respective bottle, after this bottle leaves the sorter. In other words, this is the production time for the bottle (or for the product resulting with this bottle, respectively), at that point in time, at which this bottle leaves the sorter.

In a particularly preferred embodiment of the filling plant, the sorter and/or the supply lines has an acceleration section and/or a buffer section for the bottles. The use of sufficient acceleration and/or braking sections is important in order to be able to feed the corresponding amount of bottles to the filler according to the predetermined order. According to the invention, it is thus also proposed to install sufficient buffer sections in each case, by means of which the mechanical processes are in each case uncoupled. These are, e.g., and not listed completely, the sections in the infeed of unmixed bottle types, to which the bottle amounts are accelerated. It is sensible here to buffer out smaller amounts, because a smaller mass can be accelerated more easily. The same therefore also applies for the carriages.

Particularly preferably, the control system is configured to calculate an individual production time for each bottle, in particular downstream from the sorter, and to determine the predetermined order at least on the basis of the outlet order and the individual production times of the bottles. The filling plant is thus configured to ensure the freely selectable outlet order and/or the order, the picking of which has been finished, in the mixed mode operation even when the individual production times for the different products (different bottles and/or different beverages or beverage mixtures, respectively) differ.

For example, the determination of the point in time of the bottle transfer from the supply unit is calculated backwards from the position at the last packaging machine. If the treatment duration for a larger bottle is now longer than for a smaller one, the sorter also discharges the larger bottle into the subsequent process line, according to its longer treating time. The predetermined order of the introduction can thus be different than the discharge order.

The control system can comprise, for example, a computing unit and/or a software. The software can be stored on a computer and/or in a data center (e.g. in a cloud).

In a further development of the invention, the bottle treating device has several treating positions for treating a respective bottle (e.g. filling positions of the filler carousel), wherein the individual treating positions are embodied universally for receiving all different bottle types. The treating positions can thus handle different bottle types, in particular bottle sizes and shapes directly one after the other. The treating positions can thereby either be embodied in such a way that no conversion whatsoever is necessary, such as, for example, a simple base plate, onto which the bottles can be placed. In the alternative, individual automated adjusting mechanisms can be provided, which adapt the individual treating positions to the next bottle to be received without a production interruption.

Independently of the predetermined order, each treating position can thus be used. The filling plant can be configured to not leave any treating position vacant, independently of the predetermined order between two consecutive bottles. This applies independently of the bottle type of the two consecutive bottles.

Different bottle sizes and shapes can thus be moved one after the other through the filling plant without conversion due to production interruption or even mixed up.

Particularly preferably, the sorter is configured to feed the bottles from the infeed section to individual treating positions of the bottle treating device in the predetermined order.

In the alternative or in addition, the bottle treating device can be formed as carousel device. This facilitates a simple individual insertion and removal of the bottles, in particular by means of the movers. Carousel devices can operate continuously. They are thus well suited for the mass production.

In a particularly preferred embodiment of the filling plant, the treating positions of the bottle treating device (for example the filling positions of the filler carousel) each have base plates for the bottles. Base plates can support universally different bottle sizes and bottle shapes. The base plates can absorb the weight of the bottle. The base plates preferably have a bulge, which is shaped and arranged in such a way that the platform of the gripper can engage with the bulge during the transfer of the bottles from the mover to the bottle treating device (e.g. the filler carousel). The platform can thereby be shaped at the grippers like a tooth of a toothed wheel and the bulge in the base plate as corresponding tooth gap, which engage with one another during the transfer.

According to another extremely preferred aspect, the filling plant is configured in such a way that the platforms of the respective mover and the base plates of the respective treating position mesh with one another during a transfer of a bottle between one of the movers and one of the treating positions. The filling plant can in particular be configured such that a height of the platform of the respective mover and a height of the base plate of the respective treating position are adapted.

This aspect can be formed, for example, for:
the introduction of bottles from the sorter into the bottle treating device,
the removal of bottles from the bottle treating device,
the introduction of bottles into a further bottle treating device, and/or
the removal of bottles from a further bottle treating device.

In a particularly preferred embodiment of the filling plant, the base plates are height-adjustable. The base plate can thus be set accordingly, so that it can be adapted to different bottle types (in particular bottle sizes). The height adjustment can take place by means of a servo motor. Extremely preferably, the base plates are configured to automatically approach a height, which is adapted to the bottle type, prior to the take-over of a bottle. After removal of a bottle and prior to picking up a new bottle, the base plates are thus optionally configured to a transfer level, which corresponds to the bottle type of the new bottle.

In a particularly preferred embodiment of the invention, the filling plant is configured to move the height-adjustable base plates of the individual treating positions (e.g. filling positions) upwards against a centering after take-over of a bottle, in particular until the bottle bears sealingly against the centering. Due to the centering, the bottle is clamped on the one hand, so that it not ejected due to the centrifugal forces, which appear due to the rotation of the bottle treating device, when the latter is embodied as carousel device (e.g. of the filler carousel). In addition, the bottle is sealed in order to ensure a clean filling. In the alternative or in addition, a height-adjustable resilient clamp for holding the bottles against the centrifugal forces in the bottle treating device (e.g. in the filler carousel) can also be provided. After the outfeed of a previous bottle and prior to the infeed of a new bottle, the resilient clamp can then be height-adapted to the new bottle. In the alternative, several clamps can be provided, and a bottle can in each case be held by the clamp, the height and position of which is suitable for holding the bottle.

In a further development, the filling plant is configured to move the height-adjustable base plates of the individual treating positions upwards after take-over of a bottle, in particular until the bottle sealingly abuts against the centering. After the take-over, the height-adjustable base plates and/or the height-adjustable centering can generally be moved for this purpose.

The bottle treating device can be configured, for example, to hold the bottles flush with the opening at least during the treatment (all openings at one height). This simplifies the treatment and reduces the susceptibility to errors.

Alternatively to the height-adjustable base plate or in addition, each treating position in each case comprises a height-adjustable upper holder. For example, the (upper) centering can be configured to be height-adjustable. The height adjustment can take place by means of a servo motor. The possibility of the height adjustment facilitates the reception, holding, and the treatment of different bottle types in the same treating position. Extremely preferably, the height-adjustable upper holders or centerings, respectively, are in each case configured to automatically approach a height adapted to the bottle type prior to the take-over of a bottle. After removal of a bottle and prior to the reception of a new bottle, the upper holders or centerings, respectively, are thus configured to a transfer level, which corresponds to the bottle type of the new bottle. The height-adjustable upper holders and centerings are advantageous in particular when the bottles are guided to be flush with the floor in movers, which mesh with the bottle treating device, and/or in the bottle treating device.

In a particularly preferred embodiment of the filling plant, the bottle treating device, when it is formed as carousel device, has a variable rotational speed. The bottle treating device can further be configured to dynamically adapt the rotational speed to the treatment durations of the respective bottles, which are arranged in the bottle treating device. According to the invention, the filling plant is thus configured such that if bottles with different treatment times are present in the bottle treating device at the same time, the throughput of the bottles is optimized by variation of the rotational speed.

The filling plant preferably has a removal system for removing the bottles from the bottle treating device, wherein the treatment duration of the bottles in the bottle treating device can be controlled individually.

When the bottle treating device is formed as carousel device, the filling plant particularly preferably has a removal system for removing bottles from the bottle treating device, wherein a number of cycles in the bottle treating device can be controlled individually for each bottle. The treatment duration for the bottles in the bottle treating device can thus vary in length in a simple and reliable manner. The bottle treating device can thus also be used in a very flexible and nonetheless very efficient manner for very different bottle types and very different forms of treating the individual bottles. Bottles, which individually require a longer treatment duration, simply move one or several extra rotations. There thus remains more time for treating them.

In a further development of the filling plant, the removal system has several movers, which are driven independently and individually. The movers can in particular be driven by means of a servo motor. The movers can in particular be carriages on at least one rail. Each mover has a gripper for removing the bottles from the bottle treating device (e.g. from the filler carousel). The removal system can in particular have all of the features described above for the sorter in any combination and independently of the embodiment of the corresponding bottle feed.

Particularly preferably, the removal system is further configured to transfer the removed bottles to a further bottle treating device connected downstream, preferably directly.

The filling plant preferably comprises at least one further bottle treating device, which is connected downstream from the bottle treating device. The filling plant is thus configured in such a way that the bottles initially pass through the bottle treating device, and then through the further bottle treating device. Several further bottle treating devices can in particular be connected downstream from the bottle treating device. Extremely preferably, several further bottle treating devices connected downstream from the bottle treating device in series (thus one after the other in series).

The embodiments and modifications described with respect to the bottle treating device can be applied for each further bottle treating device, and vice versa. The advantages apply accordingly.

The filling plant preferably comprises at least:
a rinser;
a filling device;
a decorating system for decorating the bottles, for example comprising a printing device and/or a labeling device;
a capping device for capping the bottles; and/or
a cap printer;

The filling plant preferably comprises all of these devices, extremely preferably connected in series in the above-mentioned order.

It is in particular advantageous that the bottle treating device, which is connected downstream from the sorter first, is formed as rinser, filling device, or decorating system.

For example, the filling plant preferably comprises the filling device, which is formed as filler carousel.

The above problem is solved in particular by means of a filler plant for filling bottles as required, comprising a continuously operating filler carousel, a first supply line, and at least one second supply line, which supplies a second bottle type, which differs from the first bottle type, and a sorter, which is configured to remove bottles from the first and/or the second supply line, and to line them up on an infeed section in a predetermined, freely selectable order.

It can be a rotating filler carousel comprising several filling positions.

The sorter can in particular be configured to feed the bottles from the infeed section to individual filling positions of the filler carousel in the predetermined order.

In this case, the second supply line is thus the "at least one further supply line" in the above sense. Analogously, the second bottle type is the "at least one further bottle type" in the above sense. In this embodiment, the filler carousel is further "the bottle treating device".

In a particularly preferred embodiment of the invention, the filling plant has a removal system for removing the bottles from the filler carousel, which is configured to remove a first bottle after a single cycle in the filler carousel, and to remove a second bottle after two or more cycles in the filler carousel. The plant is thus efficiently adapted to the different fill times. On the one hand, the fill times of a bottle depend on the size of the botte and thus on the volume to be filled, but also on the beverage to be filled, because, for example, beer beverages or also vitamin C-containing beverages are sensitive to oxygen, which is why such bottles have to be evacuated and/or flushed with $CO_2$ prior to filling in the beverages, in order to obtain an atmosphere inside the bottle, which is as oxygen-free as possible. This is not necessary in the case of mineral water or Cola beverages, and the fill time is therefore shorter. The so-called non-carbonated beverages can also be uncoupled directly after the filling, while $CO_2$-containing beverages have to be depressurized carefully, in order to avoid a foaming over. Due to the different container/beverage combinations on the filler carousel, bottles with different fill times are thus filled at the same time. Depending on the distribution, only certain bottles cannot be filled in a single cycle, but in several cycles. The removal system can be pre-programmed accordingly or can be equipped with a sensor, which either reads out a code of the bottle, in which the number of the cycles is specified, or which detects the bottle size, and determines the number of the cycles therefrom. In the alternative, it can be verified at the removal position or shortly before it, whether the filling has already concluded, and the bottle is removed only when filling has concluded. In this case, the filling plant is configured for an individually different treatment duration of the bottles in the filler carousel.

The removal system is formed according to the above-described embodiments. The closing device for closing the bottles can be provided downstream from the removal system.

In a particularly preferred embodiment of the filling plant, the filler carousel has a variable rotational speed and is configured to dynamically adapt the rotational speed to the fill times of the respective bottles arranged in the filler carousel. According to the invention, the filling plant is thus configured in such a way that when bottles with different fill times are present at the same time in the filler carousel, the throughput of the bottles is optimized by variation of the rotational speed. In addition to the rotational speed, it can in particular also be determined, which bottles stay for one, and which bottles stay for two or more cycles in the filler carousel. The filler thus does not need to be set to the longest cycle for the bottle with the longest fill time, but the bottles with the longer cycle are not removed directly from the carousel after reaching the outfeed position, but remain in the filler carousel for a second cycle. Depending on the production mix of beverage types and bottle sizes, the optimal speed can then be calculated and set for the maximum ejection. Said optimal speed is generally not identical to the sum of the longest or of the shortest fill time, plus the non-productive times for bottle change of a planned batch, but depend on the respective combination of container/beverage, which are in each case filled on the carousel. The speed of the filler is thus variable and can fluctuate from round to round on the filler carousel, depending on the bottle mix. If there are, for example, 80 filling spots on the carousel, and 75 of them are occupied with small bottles of, for example, 0.2 liters, and the other five spots are occupied with bottles of a content of 1.0 liters, it makes no sense to slow down the rotational speed so much that the 1.0 liter bottles become full in one cycle. This variability based on the number of the bottles for each type and the beverage, which is to be filled, for each bottle, can thus be optimized in an algorithm to the maximum output either by bottles per hour or liters to be filled per hour, wherein this calculation can be performed anew in an automated manner with each bottle being fed in newly.

The object is additionally solved by means of a filler carousel comprising several filling positions as well as a beverage supply for at least one base beverage and a mixing beverage, wherein a beverage is mixed on the filler carousel, individually for each bottle from the base beverage and the mixing beverage, and is filled into a bottle in the filling position. The object is in particular solved by means of a filling plant, which has such a filler carousel. The filler plant preferably also has the features of one of the above-described embodiments. The embodiments and modifications of the filler carousel described above and hereinafter can also be applied to this alternative, and vice versa. Different beverages can be filled in a predetermined order by means of the mixture of the beverages on the filler carousel. On the one hand, all of the different beverages can be filled into the same bottle type, or different bottle types can also be used in combination with the above statements.

The required storage areas can be drastically smaller with such a filler carousel or a filler plant, respectively, comprising such a filler carousel. For example, the warehouse or the warehouses for the finished products thus no longer need to be designed for the start-up of the productions of up to 24 shifts (in the case of three different bottle types and eight different beverage types). The space, which is necessary due to the production in different batches based on the different beverages or beverage mixtures, respectively, can largely be saved.

Conversion times and downtimes caused thereby based on the filling of the different beverages or beverage mixtures, respectively, are furthermore eliminated. The warehouse capacities, which need to be kept available for this purpose, are obsolete as well. Moreover, the maximum production capacity of the filling plant can be smaller. Smaller motors, smaller tanks, and smaller pumps can therefore be used. This lowers the investment costs for the filling plant, the energy consumption thereof, and therefore the $CO_2$ emission caused by it, the space requirement thereof, and the maintenance and replacement part costs required for it.

The above-mentioned advantages based on the smaller extent of the warehousing apply accordingly.

Finally, the customers' desires for different beverages or beverage mixtures, respectively, and the desired shares thereof in individual deliveries can be responded to more quickly and more flexibly. Individualized beverage mixtures can be offered without any problems.

In a preferred embodiment, the filler carousel (or the filler plant, respectively) at least one annular vessel for the base beverage and, for each tog the several filling position, respectively, one filling outlet, the filling outlets being connected to the annular vessel. The filling outlets in each case have a main line from the at least one annular vessel for the base beverage, and at least one smaller secondary line, which leads into the main line, for the mixing beverage, in each case comprising valves, which can be regulated, wherein the filling plant is configured to control the filling in such a way by means of the valves, which can be regulated, that base beverage and mixing beverage are fed in a time sequence, wherein the filling is concluded by means of the pure base beverage without mixing beverage.

If different base beverages are to be used, several annular vessels can therefore also be provided.

In particular, flavoring agents and/or syrups can be used as mixing beverage.

The flow of the filling process is then preferably such that the amounts of flavoring and/or syrup are metered into the bottle first through the filling outlet, and the base beverages then backflush or neutralize, respectively, the filling outlet, so as not to have any transfer of flavoring for the subsequent bottle in this filling outlet. If a beer/soda mixed beverage is produced, a soda is conventionally prepared to date from syrup and water, which is subsequently mixed with beer, before it is filled into the annular vessel of the filler. In this example, all of these production steps are to take place on the carousel filler, in which the syrup is initially metered into the bottle, according to the mixing ratio, which can be individually determined by the customer, and subsequently the base beverage beer, and finally the base beverage water. The line between the beverage types and the bottle is thus definitively neutral without further transfer of flavorings, and all shares mix in the bottle itself to form the final ready-to-drink beverage. Due to the fact that this takes place in a digitally controlled manner at each filling position, it is thus possible by means of such a system to produce several beverages individually for each bottle, and to simultaneously fill them with high hourly outputs.

In another preferred example, the flow of the filling process is such that flavoring and/or syrup and base beverage are first metered at the same time through the filling outlet into the bottle, wherein the filling is concluded by the pure base beverage without mixing beverage. The flavoring and/or the syrup on the one hand and the base beverage on the other hand thus mix even more quickly and better. For example, pure syrup could otherwise stick to the wall of the bottle and could not wash off completely. Due to the fact that the filling is nonetheless concluded by the pure base beverage without mixing beverage, the base beverage washes the filling outlet out and, in other words, neutralizes it. In the case of this example, it is also ensured that no transfer of flavoring to the subsequent bottle takes place.

The filler carousel can be configured such that the number of the cycles of the bottles is controlled individually depending on the beverage, with which the respective bottle is filled. As mentioned, some beverages can tend to form foam more strongly than others during the filling. In the alternative or in addition, the rotational speed can be controlled depending on the beverages, which are being filled.

By combination of the sorter with the filler carousel in a filling plant, the storage need, the costs, the need of forklifts and employees, as well as the costs can be lowered particularly drastically. This is so because the storage need is eliminated due to the production in batches because of the different bottle types as well as the storage need due to the production in batches because of the different beverages or beverage mixtures, respectively. The combination of the sorter with the described, variable filler carousel allows for a non-linear, synergistic reduction of separate production batches.

In a further preferred embodiment, the filling plant has a decorating system for decorating bottles. The decorating system can be configured to selectively and individually decorate the bottles independently of the order thereof, at least depending on the bottle type of the respective bottle and/or a beverage, with which the respective bottle is filled.

In particular, the decorating system can directly follow the sorter.

According to another aspect, the decorating system is particularly preferably arranged upstream of and/or downstream from the filler.

The decorating system can in particular be configured to attach a decoration, which is individually adapted to the individual bottle, in particular to the respective bottle size and/or the bottle content, to the bottle, which in particular meets the legal requirements. For this purpose, the filling volumes and the list of ingredients resulting from a mixing ratio, can thus be calculated and can therefore also be listed in the decoration. In addition, customer-specific decoration layouts can be used for each individual bottle. For example, individual labels can be printed. After the filling and the decoration, the bottles can be discharged individually for the further processing packaging, and can thus be sorted.

The decorating system can comprise, for example, a printing device for directly printing the bottles and/or a labeling machine. The printing device can be a digital printing device.

As mentioned above, the decorating system can have several treating positions for treating a respective bottle and can be embodied as carousel device. For example, it can be embodied similarly as the above-described filler carousel.

As is already described above, some decor will be printed easily and quickly in the decorating system, whereas other decor requires more time. This is why the filling plant is preferably configured so that a number of cycles can be controlled individually in the decorating system for each bottle. All of the bottles are thus not automatically collected one after the other from the decorating system after only one cycle through a star, as before. Instead, they can pass through a further cycle or several further cycles, if necessary. The corresponding treating position is then not yet free for the respective cycle and is not yet occupied anew. It goes without saying that the bottles can also already be removed directly again after only one cycle, as before, if no further cycle is required. This can be attained, for example, by means of a removal system according to one of the described embodiments and modifications.

In the alternative and/or in addition, the decorating system has a variable rotational speed. It can in particular be configured to dynamically adapt its rotational speed to the treatment times of the respective bottles, which are arranged in the decorating system.

The output of the decorating system can thus be optimally controlled.

If one has only short treatment times, the decorating system moves at maximum output, thus at high rotational speed. If only labels, which are to be printed in a complex manner, and/or complex direct prints are to be performed with at least approximately identical treatment durations, the decorating system moves correspondingly slow. In this state, the individual decorating processes for the different bottles in the decorating system are therefore in each case handled in only one cycle.

The rotational speed can in particular be optimized with respect to the number of the decorated bottles per time unit and/or can be optimized with respect to the fill volume of all decorated bottles per time unit (for example specified in liters per minute).

In a further example, in particular bottles with a short decorating treatment duration and bottles with long decorating treatment duration are located in the decorating device at the same time. If the share of the bottles with long decorating treatment duration is low, a decorating output is optimized, for example, in that the decorating system operates at maximum output (thus high rotational speed). The bottles with the short decorating treatment duration are completed in one cycle, and the few bottles with long decorating treatment duration pass through several cycles in the decorating system.

In an advantageous embodiment, the filling plant comprises a capper as further bottle treating device. Particularly preferably, the capper follows the filling device, in particular the filler carousel, as next bottle treating device. The bottle content, which was filled in, thus stays exposed to the surrounding area only briefly.

Particularly preferably, a removal system according to one of the described embodiments is provided for the transfer from the filler carousel to the capper.

In a particularly preferred further development, the capper is configured to apply caps to the filled bottles individually depending on the product (thus depending on the bottle type and/or the bottle content). The possible caps can comprise, for example, crown corks and/or screw caps. The capper can in particular be configured to screw on caps.

According to a preferred further development, the capper is configured for lowering to a level flush with the floor upstream of the outfeed. The outfeed from the capper thus takes place flush with the floor. The closed bottles can then be transferred, for example, to a conveyor.

In the alternative, the outfeed from the capper can take place flush with the opening. This is in particular the case when at least one further bottle treating device, in which the flushness with the opening provides advantages, follows the capper.

For example, the cap printer can be arranged downstream from the capper. The cap printer can be configured to individually print the caps, in particular on the top and/or on a circumference. It can in particular be configured to print at least one feature depending on the bottle/beverage combination onto on to the cap. For example, the print on the cap can depend on the product (characterized by bottle type and/or bottle content, including the filling amount), dependent on the customer and/or dependent on the order (e.g. for seasonal special versions or for special fillings).

In a particularly preferred embodiment of the filling plant, the control of the filling plant is controlled by means of individual codes, which are applied to the bottles and which are detected by means of at least one reader. This means that a control unit reads out the codes by means of a corresponding reader and controls the filling plant or a part thereof based on the read-out code. A reader can in particular in each case be provided at the positions, at which an action for the bottle has to take place. Readers are therefore preferably attached to most or to all transfer means between two mechanical elements or segments. A complex global control, which monitors and has to regulate the entire filling plant, can thus be highly simplified, or a global control can even be forgone completely. On the contrary, each segment of the filling plant, such as, for instance, the individual grippers, the bottle treating device, the treating positions, for example the filler carousel, the filling positions, can read out the code individually for each bottle and can read out the parameters, which are relevant for the corresponding segment. The grippers of the movers can thus be set to the correct height and opening width, the base plates in the bottle treating device (e.g. in the filler carousel) can be adjusted to the correct height, or the filling amount and type can be regulated in the filler carousel. A QR code, for example, can be used as code. It is a further advantage that the bottles can be traced in a database over their entire life cycle, whereby a bottle, which is missing in the final packaging because it broke, for example, along the way on the filling plant, can thus be reproduced without interruption of the production flow and, according to the invention, can be brought directly to that spot, where it is missing in order to conclude a process, by bypassing the normal transport means. The introduction at the correct spot can take place by reading out the information of the decor and/or by means of the bottle code, because the previous and the following bottle are known to the system.

In a particularly preferred embodiment of the filling plant, a new corresponding bottle is introduced, in the event of loss and/or break of a bottle, at the position in the predetermined order of the lost and/or broken bottle, wherein an additional transport means is preferably provided, on which the new bottle is moved to the provided position past the remaining bottles. In the event of loss and/or break, the provided production order can thus also be maintained. The replacement bottle can be supplied by a corresponding supply line or can be produced explicitly for the bottle, which is to be replaced.

In a particularly preferred embodiment of the filling plant, the predetermined order has a first sequence of bottles of different bottle types of a first order, wherein a second sequence of bottles of different bottle types of a second order is added into the first sequence, wherein a separate transport belt, which separates the bottles of the added second order from the bottles of the first order, is provided downstream from the removal means (at the outlet of the filling plant). In particular in the case of large orders with long production times, small orders could thus also be processed for a short time. Due to the fact that the entire process of the filling order is controlled by means of data processing, it can thus also be determined, when an order for a truck, the loading of which is pending, is to be carried out promptly in such a way that it can be loaded directly from the filling plant or from an only small intermediate warehouse across a short distance. It then also becomes evident, which other orders can optionally be fit in, e.g. in case the truck reports a late arrival. Further, it can also be reasonable to fit in such orders when corresponding bottle types are being filled just now in the majority, and if therefore production advantages result due to time savings. It makes no sense, e.g., to introduce small bottles when only large bottles are processed just then with longer fill time. This is why it can be sensible to introduce such bottles when only small bottles are moved at that point in time, and the filler carousel can then move at a higher speed.

Modern final packaging devices are already constructed in such a way today that they can be automatically converted to different bottle types. Only an optimization of the corresponding conversion systems is thus required in order to package the different products, which are discharged in individual order, in bottle packs so as to be ready for dispatch.

In addition, the invention relates to a method for feeding bottles as required into a bottle treating device of a filling plant,
    wherein, by means of a sorter,
        bottles of a first bottle type are removed from a first supply line and
        at least bottles of a first further bottle type are removed from a first further supply line, wherein the first further bottle type differs in shape and/or in size from the first bottle type,
    wherein the sorter lines up the bottles on an infeed section in a predetermined order, and
    wherein the bottles are fed from the infeed section in the predetermined order to the bottle treating device.

The predetermined order can in particular be selected depending on the bottle type of consecutive bottles.

The predetermined order is preferably determined based on a freely selectable outlet order, in which the bottles, the treatment of which has finished, are to leave the filling plant. This allows for an "on-the-fly" and/or "on-demand" production directly in the desired outlet order.

Particularly preferably, the predetermined order is determined in an automated manner from a production order. In the alternative or in addition, the predetermined order can be determined in an automated manner on the basis of an order.

In a further development of the method, the determination of the predetermined order takes place
    in such a way that a supply of the products, the picking of which has finished, takes place;
    in order to reach a specified outlet order;
    in consideration of a specified unloading order of one or several transport units;
    in consideration of the different treatment durations for different bottles, extremely preferably in consideration of the different total treatment durations for different bottles;
    on the basis of one or several orders; and/or
    from a production order and/or several production orders.

Particularly preferably, an individual production time is calculated for each bottle, and the predetermined order is determined at least by means of the freely selectable outlet order and/or the desired supply of the products, the picking of which has finished, on the one hand, as well as of the individual production time, on the other hand. The filling plant is thus configured to ensure the freely selectable outlet order and/or the desired supply in the mixed mode operation, the picking of which has finished, even when the production times for the different products of the mixed mode operation differ.

All bottles are preferably transferred flush with the opening, independently of the bottle type in the filling plant, starting at the supply lines, in particular between consecutive bottle treating devices. After the last treating device, they can be placed at a uniform level of a bottle transport system, for example for the transport on an outlet conveyor flush with the floor.

The guidance flush with the opening can in particular also be maintained in the rinser, which can preferably be arranged between the decorating device and the filling device.

In the alternative, all bottles are transferred flush with the floor independently of the bottle type in the filling plant, starting at the supply lines, in particular between consecutive bottle treating devices. In the alternative and/or in addition, the bottles can be guided flush with the floor in the bottle treating device and/or optionally the further bottle treating devices. This lends itself, for example, when only different types of glass bottles are filled.

An advantageous further development is a method for filling bottles as required, wherein bottles in a first shape and/or size are removed from a first supply line, and bottles of a second shape and/or size are removed from a second supply line, and are brought into a predetermined order on an infeed section, and are fed from the infeed section in the predetermined order to a filler carousel, and are filled on the filler carousel.

In addition, the invention relates to a method for filling bottles as required, wherein at least one first and a second bottle are fed to a filler carousel and are simultaneously filled on the filler carousel, wherein at least one base beverage and preferably at least one mixing beverage is mixed on the filler carousel and is filled into the first bottle as a first mixture, and a second mixture, which differs from the first mixture and which is mixed on the filler carousel from at least one base beverage and at least one mixing beverage, can be filled into the second bottle. This means that one of the mixtures can optionally also consist only of the base beverage.

The methods can preferably likewise have the features described above in connection with the filling plant in any combination, and vice versa. The advantages apply accordingly.

When different bottles can thus be processed in the mixed mode operation, and when they simultaneously obtain an individual beverage mixture during the filling, a warehousing for the many product/bottle type combinations can be eliminated.

It is thus possible to plan the filling for a truck in such a way that when it arrives, the beverages are produced in reverse order to the unloading and are loaded onto the truck just in time.

The proposed filling plants and methods provide for a "digital filling". Digital filling means to directly produce that, which is on demand just then ("on-demand"). The filling plant is preferably configured for the fully-automatic on-demand production. For example, the production planning and the filling can be controlled in an automated manner without human intervention by means of a direct take-over of an online order. In addition, an estimated pick-up time by the customer or an estimated or required shipping time, respectively, can be considered thereby.

The filling plants and methods in particular allowed for a mixed mode operation of glass bottles, plastic bottles, and/or metal bottles and/or of different beverage fillings.

All disadvantages, such as re-packaging of partial pallets, long forklift routes are thus eliminated, which drastically reduces the number of employees and the forklifts required there. The storage area is no longer required, the heating in the winter against bottle breakage due to freezing is eliminated, the downtimes of the trucks are shortened. The logistics costs decrease significantly, and customers always receive fresh goods, there is no risk of over-storing. In addition, the capital tie-up of the company is drastically reduced.

BRIEF DESCRIPTION OF THE DRAWING FIGURES

The invention will be described below on the basis of exemplary embodiments and with reference to the figures. All of the described and/or graphically depicted features, either alone or in any combination, thereby form the subject matter of the invention, also independently of their combination in the claims or the dependencies thereof.

FIG. 1 shows a schematic illustration of a first embodiment of the filling plant according to the invention, FIG. 2a shows a schematic illustration of a mover, which is adapted to a first bottle type, of the filling plant according to the invention, FIG. 2b shows a schematic illustration of a mover, which is adapted to a second bottle type, of the filling plant according to the invention, FIG. 2c shows a schematic illustration of a first embodiment of a mover, which can be dynamically adapted to different bottle types, of the filling plant according to the invention, FIG. 2d shows a top view onto the mover of FIG. 2c, FIG. 3 shows a schematic illustration of a second embodiment of the filling plant according to the invention, FIG. 4a shows a filling position of a filling plant according to the invention directly after the transfer of a bottle, FIG. 4b shows a filling position of a filling plant according to the invention during the filling of a bottle;

DETAILED DESCRIPTION OF THE INVENTION

Figure 1:
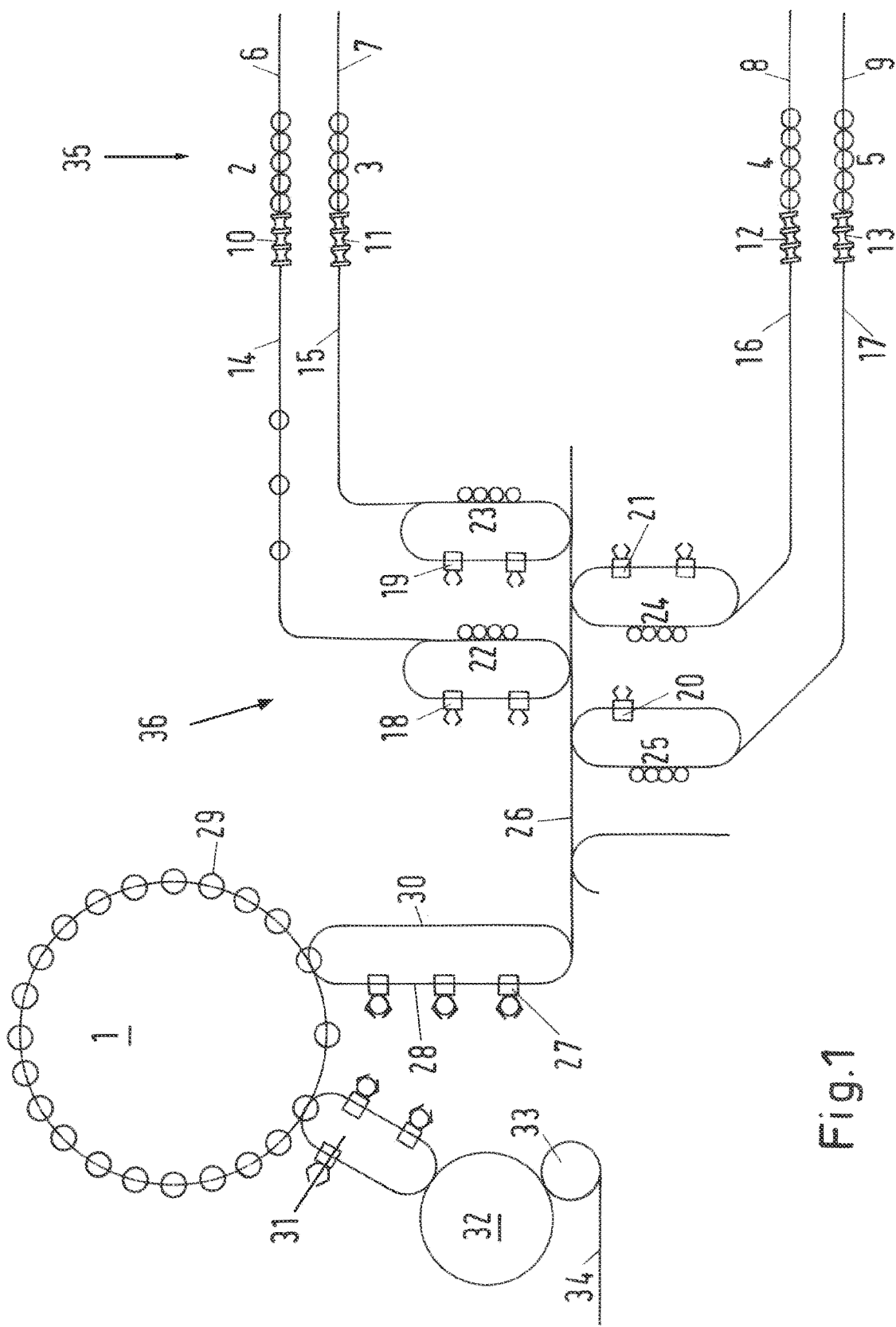

FIG. 1 shows a first embodiment of the filling plant according to the invention comprising a filler carousel 1, which has universal filling positions 29, in order to be able to receive different bottle types 2, 3, 4, 5. A supply line 35, which supplies the respective bottle type 2, 3, 4, 5, is in each case provided for each bottle type 2, 3, 4, 5. The first supply line 35 of the first bottle type 2 has a corresponding feed conveyor 6 of this bottle type 2, which delivers the bottles, for example from a warehouse, a cleaning system, or directly from a bottle production. An allocating screw 10 is further provided, in order to systematically hand off the bottles to an accelerating section 14 only if required or with a predetermined frequency. The bottles of the first bottle type 2 are accelerated or decelerated on the accelerating section 14 all the way to a transfer point with a sorter 36. In a corresponding manner, three further supply lines 35 are arranged parallel to the first supply line, which are likewise in each case equipped with an infeed conveyor 7, 8, 9, and which have an allocating screw 11, 12, 13 in order to be able to dispense the bottles of the bottle types 3, 4, 5 to corresponding accelerating sections 15, 16, 17 in each case. The accelerating sections 15, 16, 17, in turn, in each case end at a corresponding transfer point at the sorter 36.

The sorter 36 has an infeed section, which is formed as linear conveyor 26, as well as an unmixed rail region 22, 23, 24, 25 each for each supply line 35 between the respective supply line 35 and the infeed section. To transfer the individual bottles from the linear conveyor 26 to the filler carousel 1, the sorter 36 has a mixed rail region 30, a closed rail section on which movers move, which can receive different bottle types, thus convey in a mixed manner, between the linear conveyor and the filler carousel 1. This mixed rail region serves the purpose of accelerating as well as of decelerating movers, optionally until standstill, if, e.g., a spot on the filler carousel is to not be occupied once, and the mover thus has to wait for the next free spot.

The accelerating section 14 of the first bottle type 2 ends in a transfer point with the first unmixed rail region 22. The transport paths of the supply line 35 and of the unmixed rail region 22 intersect in the transfer point or come so close to one another at the transfer point, respectively, that a transfer of a bottle can take place. The unmixed rail region 22 is formed to be circumferentially closed, wherein several carriages 18 comprising grippers are arranged on the unmixed rail region 22. The grippers of the carriages 18 on this rail region 22 are firmly adapted to the first bottle type 2, so that they can securely hold a bottle of the first bottle type 2. A buffer section is provided at the transfer point between the accelerating section 14 and the unmixed rail region 22, at which buffer section the bottles of the first bottle type 2 are buffered out, so that sufficient bottles of the first bottle type 2, which can be taken over by the carriage 18, are always present at the unmixed rail region 22. For this purpose, a carriage 18 moves to the transfer point and grips a bottle of the first bottle type 2 from the buffer section there. Depending on the current dynamic of the filling plant, the bottles can move at a speed of greater than zero at the point in time of the take-over, or the bottles can stand still on the buffer section. The carriage 18 therefore moves to a transfer point and thereby sets its weight so as to match the speed of the bottle. This means that the carriage 18 either decelerates in order to receive an upright bottle, or accelerates to the bottle speed in order to be able to directly take over said bottle in the movement.

In the same way, the accelerating sections 15, 16, 17 of the remaining supply lines for the bottle types 3, 4, 5 end in the unmixed rail regions 23, 24, 25, on which carriages 19, 20, 21 are in each case arranged, which are in each case adapted to the bottle types 3, 4, 5 of the respective supply line 35, in order to be able to take over the bottles from the respective accelerating section.

The individual carriages 18, 19, 20, 21 on the respective unmixed rail regions 21, 22, 23, 24 are configured to remove bottles from the respective supply lines 35, and to arrange them at a transfer point on the infeed section, which is formed as linear conveyor 26, in the predetermined order. The linear conveyor then conveys the bottles all the way to a mixed rail region 30 in the predetermined order.

In the embodiment shown in FIG. 1, all bottles of the different bottle types 2, 3, 4, 5 are conveyed flush with the floor on the linear conveyor 26. This embodiment thus represents an embodiment flush with the floor.

The mixed rail region 30, in turn, is arranged at the end of the linear conveyor. The mixed rail region 30 is likewise formed in a circumferentially closed manner, and several carriages 27 are located on the mixed rail region 30, wherein the carriages 27 are equipped on the mixed rail region 30 with grippers, which can universally receive all bottle types 2, 3, 4, 5, in that they are dynamically adjustable and can thus be adapted to the different bottle shapes and sizes. The mixed rail region 30 has two transfer points. A first transfer point between the mixed rail region 30 and the infeed section formed as linear conveyor 26, and a second transfer point between the mixed rail region 30 and the filler carousel 1 comprising the filling positions 29.

The mixed rail region 30 has a preferred direction, in which all carriages 27 generally move on the mixed rail region 30. In the alternative illustrated in FIG. 1, all carriages move clockwise along the mixed rail region 30. The mixed rail region 30 thus has a first side 28 between the transfer point comprising the linear conveyor, and the transfer point comprising the filler carousel 1, on which the carriages move, which comprise bottles received in the grippers. This side thus forms a buffer section 28 for the transfer of the bottles to the filler carousel 1. The opposite side between the transfer position between the mixed rail region 30 and the filler carousel 1 and the transfer position between the linear conveyor and the mixed rail region 30 forms a buffer section for carriages 27 comprising empty grippers.

The carriages 27 can wait in the buffer section 28, until they are to dispense their bottle, which is held in the grippers, to the filler carousel 1. If this is the case, the carriages 27 accelerate, so that they have the same speed as the tangential speed of the filler carouse 1 in the transfer point with the filler carousel 1. The bottle can thus be transferred from the carriage 27 to the filler carousel 1 without a relative speed, and can be transferred into the respective filling position 29 there. On their way back on the rail region 30, the carriages 27 are in each case set to the next bottle, which is to be taken over.

The bottles then revolve counterclockwise around the filler carousel 1 in the individual filling positions 29, and are removed from the filler carousel 1 at a removal means 31 after one or several cycles. The removal means 31 is likewise embodied as mixed rail region comprising several carriages, which have grippers, which can universally grip all bottle types 2, 3, 4, 5. The carriages in the mixed rail region of the removal means 31 can likewise be accelerated to the same tangential speed as the filler carouse 1, in order to be able to remove a bottle from the filler carousel 1 without relative movement. The carriages can then accelerate or decelerate to a speed, which corresponds to a following capper 32, and can therefore transfer the bottles to the capper 32. The bottles are closed in the capper 32 before they are transferred to a transport belt 34 via an outfeed star 33.

FIG. 2a) shows a first carriage 18 on a rail 22, which is equipped with a gripper 37. In the illustration of FIG. 2a) to FIG. 2c), the rail 22, 23, 30 runs out of the drawing plane. The gripper 37 is firmly formed to carry a bottle of the first bottle type 2. For this purpose, the gripper 37 has first gripper tongs comprising two gripper arms 38a, 38b, as well as second gripper tongs comprising two gripper arms 39a, 39b. In addition, a platform 40 is provided as floor support, in order to be able to also carry heavy bottles.

FIG. 2b) shows a second carriage 19 on a rail region 23 comprising a gripper, which is configured to carry bottles of the second bottle type 3. The upper tongs of the two gripper arms 38a, 38b is arranged at the same height as in the case of the first carriage 18, so that the two different bottle types 2, 3 are moved flush with the opening in the sketched plane 43. Compared to the first carriage 18, the second gripper tongs 39a, 39b are arranged at a larger distance to the first gripper tongs 38a, 38b, so that they are adapted to the longer shape of the second bottle type 3. A platform 40 is likewise provided as floor support, which is likewise attached slightly deeper, so as to match the larger length of the second bottle type 3.

FIG. 2c) now shows a carriage 27 on a rail region 30 comprising a gripper, which can be universally adapted to different bottle types 2, 3, 4, 5. For this purpose, said carriage likewise has upper gripper tongs 38a, 38b, which are arranged at the same height as in the case of the grippers of FIGS. 2a) and 2b), so that the different bottle types 2, 3, 4, 5 are thereby also moved flush with the opening. The lower gripper tongs 39a, 39b can be height adjusted jointly with the platform 40, so that the gripper can be dynamically adapted to different bottle sizes.

FIG. 2d) shows the carriage 27 comprising grippers of FIG. 2c) in a top view. The carriage 27 runs on the rail 30, wherein the gripper is arranged at the carriage 27 in such a way that the carriage 27 is essentially located at the opening height.

The gripper arms 39a, 39b rotate around an axis of rotation 41a or 41b, respectively, and have a V-shaped hand for gripping the bottles from two sides. By means of the V-shaped hand and a synchronous closing movement of the gripper arms 39a, 39b, different bottle diameters are all centered on a common center. The same therefore applies for the gripper arms 38a, 38b.

A rail 42 for height-adjusting the gripper arms 39a, 39b is arranged between the rotary supports of the gripper arms 39a, 39b.

It becomes clear from FIGS. 2a) to 2d) that the grippers are arranged at the carriages 18, 19, 20, 21, 27 in such a way that a held bottle is located essentially only below the carriage 18, 19, 20, 21, 27 and preferably also below the respective rail. In addition, the bottle is also held laterally offset to carriages 18, 19, 20, 21, 27 and rail. In the event of a breakage of glass, shards can thus not fall into the transport mechanism and block or destroy the latter.

Figure 3:
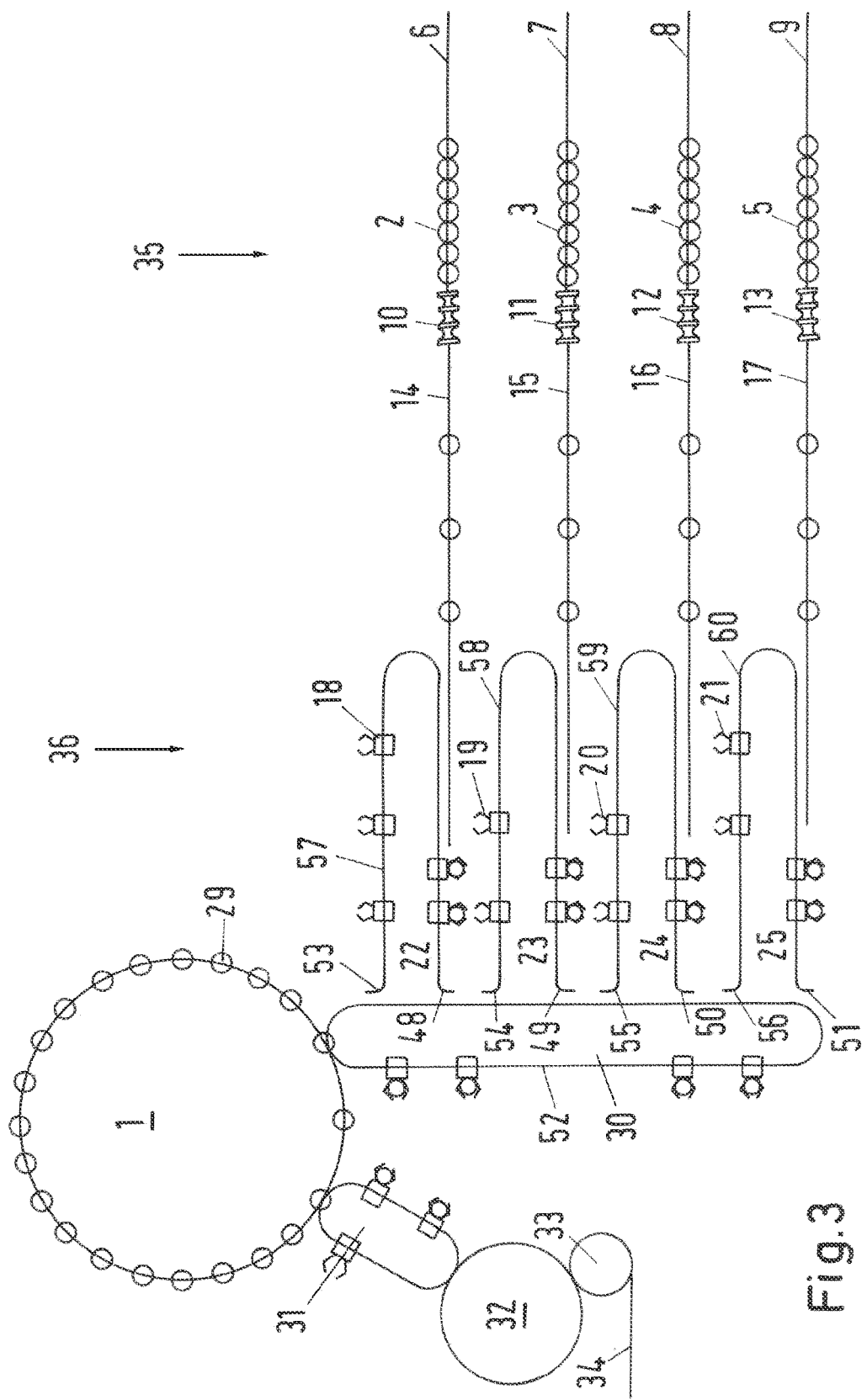

FIG. 3 shows an alternative embodiment of the filling plant according to the invention, comprising a filter carousel 1, which likewise has universal filling positions 29, in order to be able to receive different bottle types 2, 3, 4, 5. A supply line 35, which supplies the respective bottle type 2, 3, 4, 5, is in each case again provided for each bottle type 2, 3, 4, 5. The first supply line 35 of the first bottle type 2 again has a corresponding infeed conveyor 6 of this bottle type 2. A corresponding allocating screw 10 is further likewise provided, in order to systematically hand off the bottles to an accelerating section 14 only if required or with a predetermined frequency. The bottles of the first bottle type 2 are accelerated on the accelerating section 14 all the way to a transfer point with a sorter 36. Exactly as the supply line 35 of the other bottle types 3, 4, 5, the supply line 35 of the first bottle type 2 is thus constructed identically to the embodiment of FIG. 1. For each bottle type (2, 3, 4, 5), the height of the supply line 35 is preferably already set in such a way that all bottles are moved with their opening at the same height.

The sorter 36, which is arranged between the supply lines 35 and the filler carousel 1, however, differs from the corresponding sorter 36 of the embodiment of FIG. 1. The sorter 36 of FIG. 3 has one unmixed rail region 22, 23, 24, 25 each for each supply line 35, which is formed as open rail region. Front and rear end of each unmixed rail region are in each case connected to an infeed section via a switch 48, 49, 50, 51, 53, 54, 55, 56, which is embodied as mixed rail region 30. The mixed rail region 30 is embodied as circumferentially closed rail region, and meshes with the filler carousel 1 at a transfer point to transfer the bottles. This mixed rail region 30 also serves to accelerate and/or decelerate movers.

First carriages 18, which are firmly adapted to the first bottle type 2, are arranged in the first unmixed rail region 22. The empty carriages 18 wait in a buffer or waiting region 57 of the unmixed rail region 22, and can move from there to a transfer point, at which the first supply line 35 ends at the unmixed rail region 22, in order to be able to take over a bottle from the first supply line 35 there. The first carriage 18 can then change to the mixed rail region 30 with a received bottle via the switch 48. The carriages 19, 20, 21 are arranged in the unmixed rail regions 23, 24, 25 in the same way and are in each case firmly adapted to the bottle types 3, 4, 5. There, they can wait in the buffer or waiting regions 58, 59, 60 until they are to take over a bottle from the respective supply line 35 in the respective transfer point, and then move via the switches 49, 50, 51 to the mixed rail region 30. The carriages 18, 19, 20, 21 are controlled in such a way that they line up in the predetermined order on the mixed rail region 30 comprising the respectively received bottles. The carriages 18, 19, 20, 21 then move in the predetermined order next to one another to the transfer point between the mixed rail region 30 and the filler carousel 1, in order to transfer their bottles into the respectively provided filling positions 29 there. After the transfer of the bottles, the carriages 18, 19, 20, 21 continue to move to the respective switch 53, 54, 55, 56 of the unmixed rail region 22, 23, 24, 25 of the supply line 35 of their respective bottle type 2, 3, 4, 5. There, the carriages 18, 19, 20, 21 leave the mixed rail region 30 and change back into the respective unmixed rail region 22, 23, 24, 25 of the respective supply line, to the bottle type 2, 3, 4, 5 of which they are adapted.

The removal means 31, capper 32, outfeed star 33, as well as transport belt 34 can be formed as in the embodiment of FIG. 1.

Figure 4:
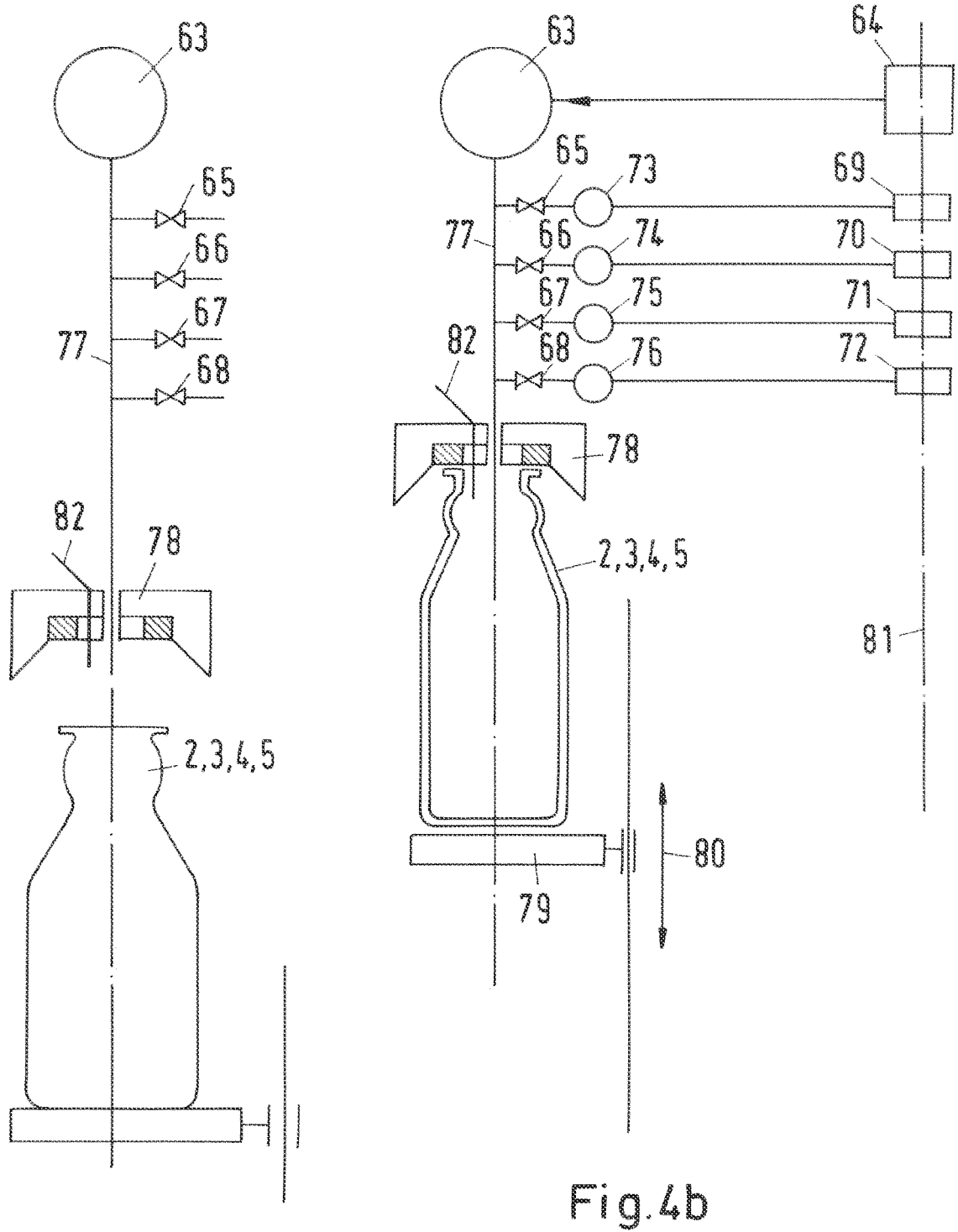

The universal filling positions 29 in the filler carousel 1 are illustrated in FIGS. 4a) and 4b). FIG. 4a) thereby shows a bottle 2, 3, 4, 5 after the transfer to the filler carousel 1 in a filling position 29 standing on a base plate 79. The bottle thereby stands centrally below a filling pipe 77, which forms a filling outlet, and a centering 78. The position is in each case flush with the opening for all bottles because the base plate 79 was in each case moved to a height, which is adapted to the height of the bottle to be received, in each case by means of an adjusting mechanism 80, which is driven by means of a servo motor, prior to the bottle take-over.

After the take-over of the bottle, the adjusting mechanism 80, which is driven by means of a servo motor, continues to lift the base plate 79 and thus the bottle 2, 3, 4, 5. The opening of the bottle thereby comes into contact with the centering 78, in particular with a seal provided in the centering 78. By continued lifting of the base plate 79, the centering 78 with the bottle 2, 3, 4, 5 is moved further upwards. The centering 78 can thereby be spring-supported, in order to exert a certain counter-force of the seal on the opening of the bottle, in order to attain a good seal. The bottle is thereby moved over the lower end of the filling pipe 77. The lift ends as soon as the bottle is in its provided filling position, as illustrated in FIG. 4b). An exhaust air opening 82, through which the displaced air can be discharged during the filling with the beverage, is furthermore provided in the centering 78.

The filling pipe 77 is connected to an annular vessel 63, which is arranged on the filler carousel, and in which the base beverage is temporarily stored. The annular vessel 63, in turn, is supplied with the base beverage via a rotary feedthrough 64. Several secondary pipes for flavorings run laterally through smaller feed valves 65, 66, 67, 68 into the filling pipe 77. A small annular vessel 73, 74, 75, 76, in which the flavorings are stored, is in each case provided for each of the flavorings. The annular vessels of the flavorings are likewise supplied via a rotary feedthrough 69, 70, 71, 72.

During the filling process, the respectively required flavorings are now metered in via the feed valves 65, 66, 67, 68, either prior to the filling with the base beverage from the annular vessel 63, or at the same time therewith. The filling process with the flavorings is thereby kept shorter than the filling duration for the base beverage itself. At the end of the filling, only the pure base beverage is thus filled, so that the filling pipe 77 is thus backflushed, so as not to allow any transfer of flavoring into the next bottle. Each individual bottle can thus be filled digitally with a different beverage or a different beverage mixture.

Figure 5:
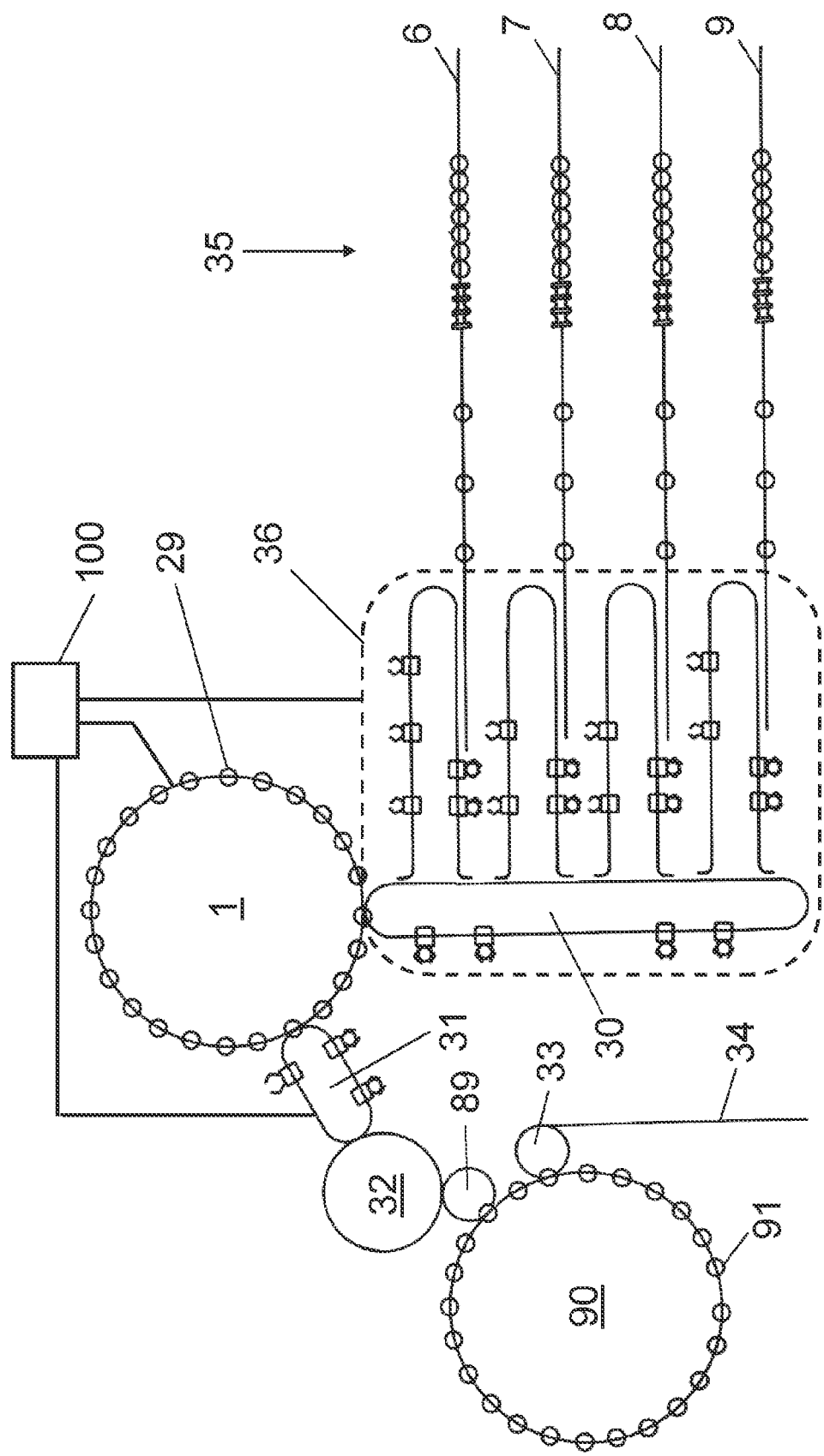
FIG. 5 shows a schematic illustration of a modification of the second embodiment of the filling plant according to the invention from FIG. 3, which has a decorating system as a further bottle treating device.

FIG. 5 shows a schematic illustration of a modification of the second embodiment of the filling plant according to the invention from FIG. 3. Identical elements are identified with the same reference numerals and are not described again.

In addition to FIG. 3, the modification according to FIG. 5 has a decorating system 90. In this example, the decorating system 90 is designed as a carousel device, similarly as the filler carousel 1. Similarly as the filler carousel 1, it has universal treating positions 91. The universal treating positions 91 are in each case configured to receive all bottle types 2, 3, 4, 5.

In this case, the outfeed star 33 connects directly to the decorating system 90. More precisely, the treating positions 91 mesh with a transfer star 89 at the inlet side and with the outlet star 33 at the outlet side.

Similarly as in the case of the filler carousel 1, each treating position 91 of the decorating system 90 has a base plate, which can be height-adjusted by means of a servo motor. After the delivery of a completely decorated bottle from one of the treating positions 91, the base plate thereof is moved automatically to a transfer level for the bottle, which is to be newly received. This is why bottles of the different bottle types 2, 3, 4, 5 can also be handled flush with the opening and in arbitrary order one behind the other in the decorating system 90.

The decorating system 90 is configured to individually decorate the bottles, for example for the decoration of the bottles at least with the corresponding necessary information with respect to content mixing ratio, bottle volume, legal requirements, and/or features for logistics. The decorating system 90 can be, for example, a labeling and/or a direct printing machine. The individual decor can depend on the bottle size, the bottle content of the product, the legal requirements, and/or codes to be applied for automatic identification systems. Such codes can play a role, for example, in the following logistics. In the alternative or in addition, codes can be used for the control of subsequent bottle treating devices of the same filling plant.

In this modification, the capper 32 and the decorating system 90 each form a further bottle treating device that are connected downstream in series from the first bottle treating device downstream from the sorter 36, thus in this case the filler carousel 1.

In addition to FIG. 3, a central control system 100 of the filling plant is illustrated in FIG. 5. The control system 100 is connected, for example, at least to the sorter 36, the filler carousel 1, and the removal system (the removal means 31). This makes it possible in a simple way that bottles can individually move different number of cycles in the filler carousel 1. For example, a bottle with a larger fill volume (a larger bottle) can remain in the filler carousel 1 for two cycles, while a bottle with a smaller fill volume (a smaller bottle) is already filled completely after its first cycle, and is removed from the filler carousel 1 directly after its first cycle by a mover of the removal means 31. The number of the cycles in the filler carousel 1 can thus differ individually for different bottles or desired products, respectively.

This has the result, however, that compared to the smaller bottle, the larger bottle is displaced backward in the order. The predetermined order is no longer adhered to downstream from the filler carousel 1 or downstream from the removal means 31, respectively. More generally, the filling plant can change an outlet order of the bottles at an outlet of the filling plant compared to the predetermined order at the sorter 36, in particular due to different individual treatment durations of different bottles.

The individual orders of the customers, including the desired unloading order for at least one transport unit for the products (such as, for example, for one or several trucks) are fed into the control system 100. The control system 100 reverses the desired unloading order. It thus obtains a desired outlet order, with which the completed products (the filled, closed, and decorated bottles) are to be discharged at the end of the filling plant. This outlet order thus corresponds to a matching loading order for the at least one transport unit. In the alternative or in addition, the controller can be configured such that the outlet order can be manually specified and/or can be manually changed.

The control system 100 preferably calculates the expected total treatment duration for each bottle to be filled. The total treatment duration is the individual time, which the respective bottle requires in order to pass through the filling plant from the sorter 36 to the end of the filling plant. In the alternative or in addition, the control system 100 can calculate the difference of the total treatment durations. With this in mind, the differences can also be respective differences to a standard value. Downstream from the sorter 36, only the filler carousel 1 changes the order of the bottles in FIG. 5. It is sufficient here to only consider the different treatment durations in the filler carousel 1.

Based on the desired outlet order and the (differences of the) total treatment durations, the control system 100 determines the predetermined order in such a way that the desired outlet order is reached in spite of the different total treatment durations. The control system 100 further controls the sorter 36 in such a way that it lines up the bottles in the predetermined order on the infeed section (here the mixed rail region 30). If, for example, the large bottle has to move two cycles in the filler carousel, the control system 100 therefore moves its position in the predetermined order further ahead.

Instead of the outfeed star 33, a further removal means comprising movers (such as the removal means 31), which selectively removes the decorated bottles from the decorating system 90, can connect to the decorating system 90 in a non-illustrated further development. This makes it possible that individual bottles can individually and selectively move one or several cycles in the decorating system 90. If the decorating for a bottle requires more time, this bottle can remain in the decorating system 90, for example for two or more cycles. In this case, the control system 100 is preferably also connected to the decorating system 90 and the removal system thereof. The control system 100 will then additionally consider individual treatment durations of the bottles in the decorating system 90 when determining the predetermined order.

The control system 100 can further be connected to one, several, or all supply lines 35 (not shown). The control system 100 can thus also monitor and/or control the respective supply lines 35. The same applies with respect to the capper carousel 32, the transfer star 89, the outfeed star 33, and the/or the transport belt 34.

Figure 6:
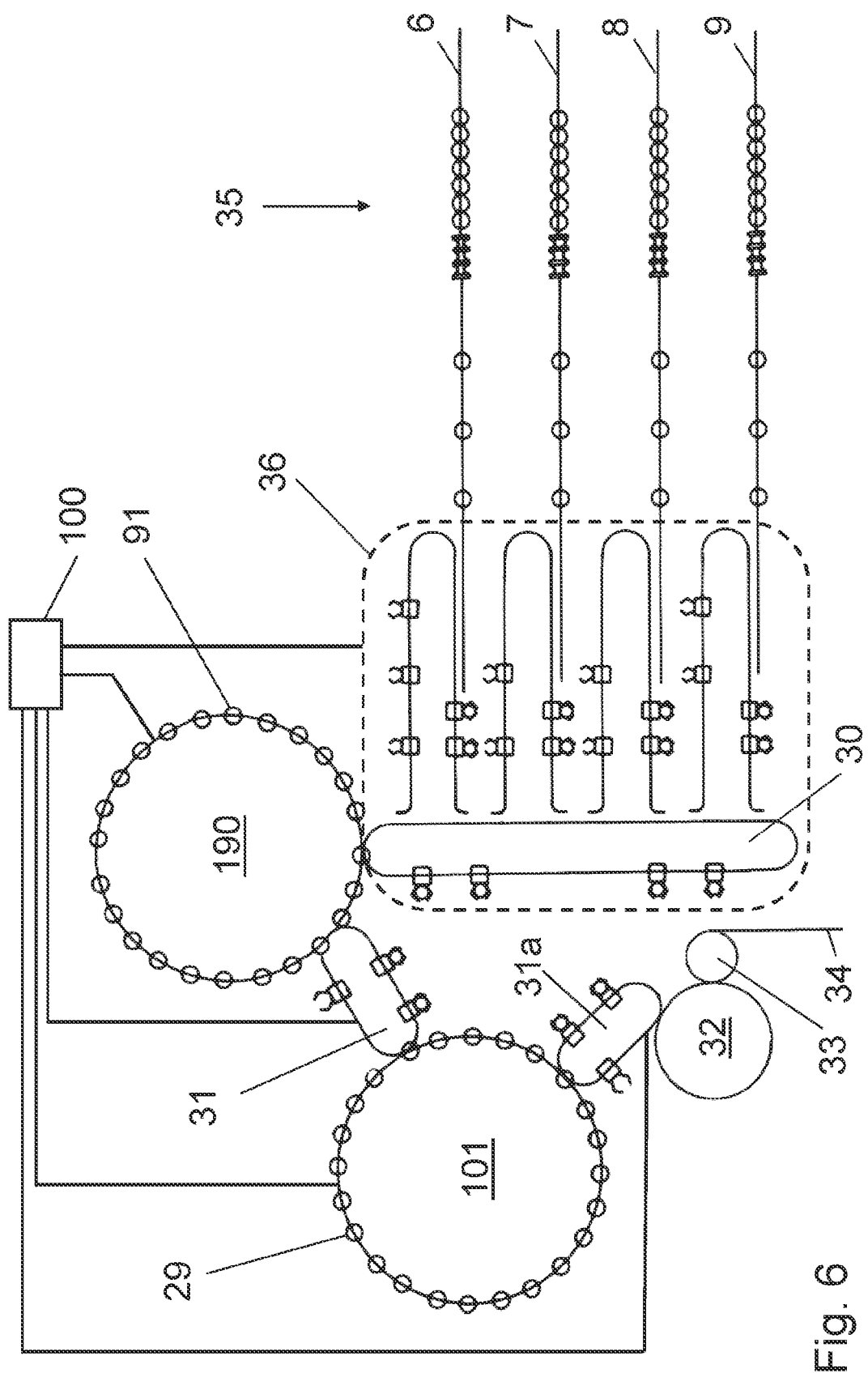
FIG. 6 shows a schematic illustration of a third embodiment of the filling plant according to the invention, in the case of which a decorating system adjoins a sorter as a first bottle treating device.

FIG. 6 shows a schematic illustration of a third embodiment of a filling plant according to the invention. Identical elements as in the case of the second embodiment in FIG. 3 or the modifications thereof according to FIG. 5 are identified with the same reference numerals and are not described again, unless otherwise specified.

A decorating system 190 is connected directly downstream from the sorter 36 in FIG. 6. The decorating system 190 thus forms the first bottle treating device downstream from the sorter 36 here.

In this example, the decorating system 190 is embodied like the decorating system 90 from FIG. 5, unless otherwise specified. The decorating system 190 is thus also formed as carousel device and has a plurality of individual treating positions 91, which are arranged around an outer circumference of the decorating system 190. Again, each of the treating positions 91 in each case has a height-adjustable base plate.

At a transfer point, the mixed rail region 30 meshes with the decorating system 190 for transferring the bottles. Here, the carriages 18, 19, 20, 21 move to the transfer point between the mixed rail region 30 and the decorating system 190 in the predetermined order one after the other, in order to transfer their bottles into the respectively provided treating positions 91 there.

The bottles then revolve counterclockwise around the decorating system 190 in the individual treating positions 91. The bottles are selectively removed from the decorating system 190 after an individual number of cycles by means of the removal means 31. As before, the removal means 31 has universal movers or carriages, respectively, for all bottle types 2, 3, 4, 5, for example carriage 27 of the type shown in FIG. 2c and/or carriage 118 of the type shown in FIGS. 7a to 7d.

In the third embodiment, the removal means 31 transfers the bottles from the decorating system 190 to a filler carousel 101. The filler carousel 101 is connected downstream from the decorating system 190 as a further bottle treating device.

This has the advantage that the bottles are not yet filled during the decorating and thus have less weight. They can be moved, accelerated, and decelerated more easily. Among other things, this lowers the energy consumption for the decorating, and thus improves the carbon footprint.

The filler carousel 101 is formed like the filler carousel 1 in FIGS. 1, 3, and 5. It in particular has the same type of treating or filling positions 29, respectively.

A further removal system (a further removal means 31a) connects to the filler carousel 101. The removal means 31a is formed like the removal means 31. It is configured to selectively remove the bottles from the treating positions 29 of the filler carousel 101 and to transfer them to the capper 32. In other words, the removal means 31a (more precisely the mover or carriage thereof, respectively), meshes with the filler carousel 101 on the one hand, and with the capper 32 on the other hand. The bottles can thereby remain in the filler carousel 101 for an individual number of cycles.

As in FIG. 1, the outfeed star 33 and the transport belt 34 follow the capper 32. In further developments, one or several further bottle treating devices can follow in the filling plant, for example a separate cap printer.

In the third embodiment, the filling plant provides individual treatment durations for the individual bottles, both in the decorating system 190 and in the filler carousel 101.

The control system 100 is therefore connected here, for example, at least to the sorter 36, the decorating system 190, the removal means 31, the filler carousel 101, and the second removal system 31a, and is configured to control these devices. The control system 100 is configured to consider the individual treatment durations for the bottles in the decorating system 190 and/or in the filler carousel 101, in particular when determining the predetermined order for the sorter 36. The control system 100 is in particular configured here to calculate the individual total treatment durations (or at least the differences of the total treatment durations) for the bottles, and to consider them in this way when determining the predetermined order for the sorter 36. The control system 100 controls the sorter 36 accordingly.

As has been explained above with reference to FIG. 5, the control system 100 can thus reach, for example, the desired outlet order or loading order, respectively, for the at least one transport unit.

The control system 100 is further configured here to control a variable rotational speed of the decorating system 190 and/or a variable rotational speed of the filler carousel 101.

If, for example, only or mainly bottles with a large filling volume are just now filled in the filler carousel 101, the control system 100 can reduce the rotational speed of the filler carousel 101 to the extent that the large bottles are filled in only one cycle. All large bottles then do not need to remain in the filler carousel 101 for two or more cycles.

It goes without saying that the modification according to FIG. 5 and the changes of the third embodiment shown in FIG. 5 can analogously also be transferred to the first embodiment from FIG. 1.

FIGS. 7a to 7d show a universal mover or a universal carriage 118, respectively, according to a second embodiment.

Figure 7A:
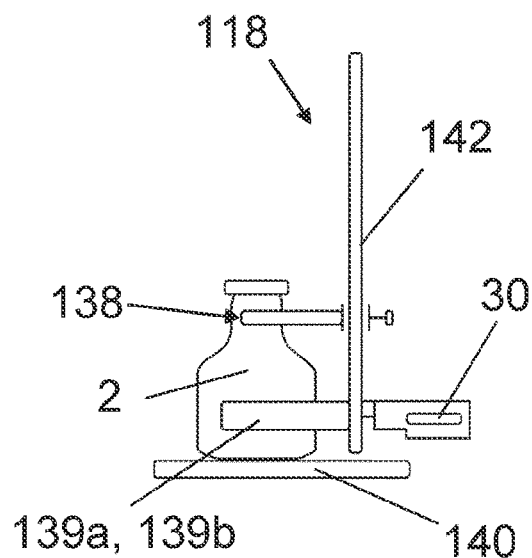
FIGS. 7a to 7c show schematic side views of a second embodiment of a mover, which can be dynamically adapted to different bottle types, of the filling plant according to the invention comprising height-adjustable upper gripper tongs, wherein bottles of different bottle types are received into the mover in FIGS. 7a to 7c.
Figure 7B:
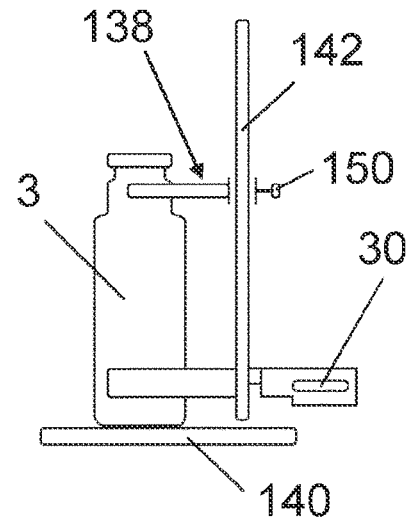
Figure 7C:
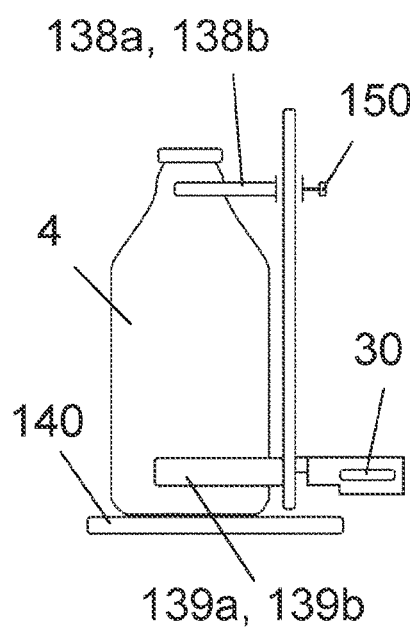

The carriage 118 has a servo motor and can move individually on the rail 30. In the illustration of FIGS. 7a to 7c, the rail 30 runs out of the drawing plane.

The carriage 118 is equipped with a gripper. The gripper has upper gripper tongs 138 comprising two gripper arms 138a, 138b, as well as lower gripper tongs comprising two gripper arms 139a, 139b.

Figure 7D:
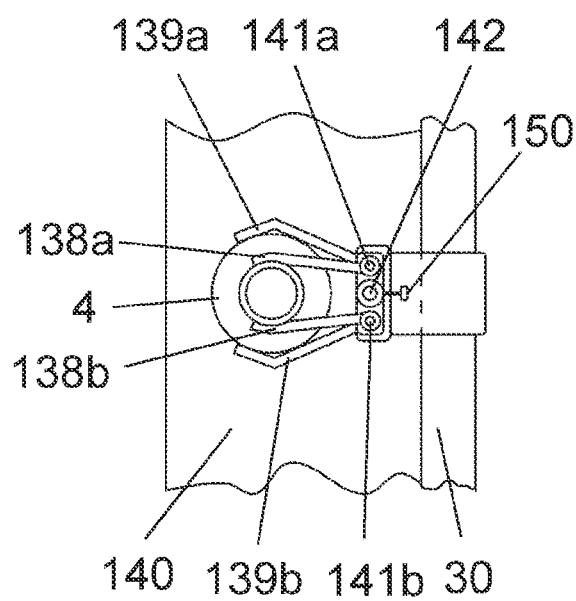
FIG. 7d shows a schematic top view onto the mover of FIG. 7c.

The upper gripper arms 138a, 138b rotate around a respective axis of rotation 141a or 141b, respectively, and have a V-shaped hand for gripping the bottles from two sides (see FIG. 7d). By means of the V-shaped hand and a synchronous closing movement of the gripper arms 138a, 138b, different bottle diameters are in each case centered on a common center. The same applies accordingly for the lower gripper arms 139a, 139b.

A rail 142 for height-adjusting the upper gripper tongs 138 is arranged between the rotary supports of the gripper arms 138a, 138b. An engageable element 150 for a slotted guide 160 is further arranged at the upper gripper tongs 138. In this case, the engageable element 150 protrudes on a side facing away from the two upper gripper arms 138a, 138b. The engageable element 150 makes it possible in a simple way to adjust the height of the upper gripper tongs 138 by means of the slotted guide 160.

Figure 8:
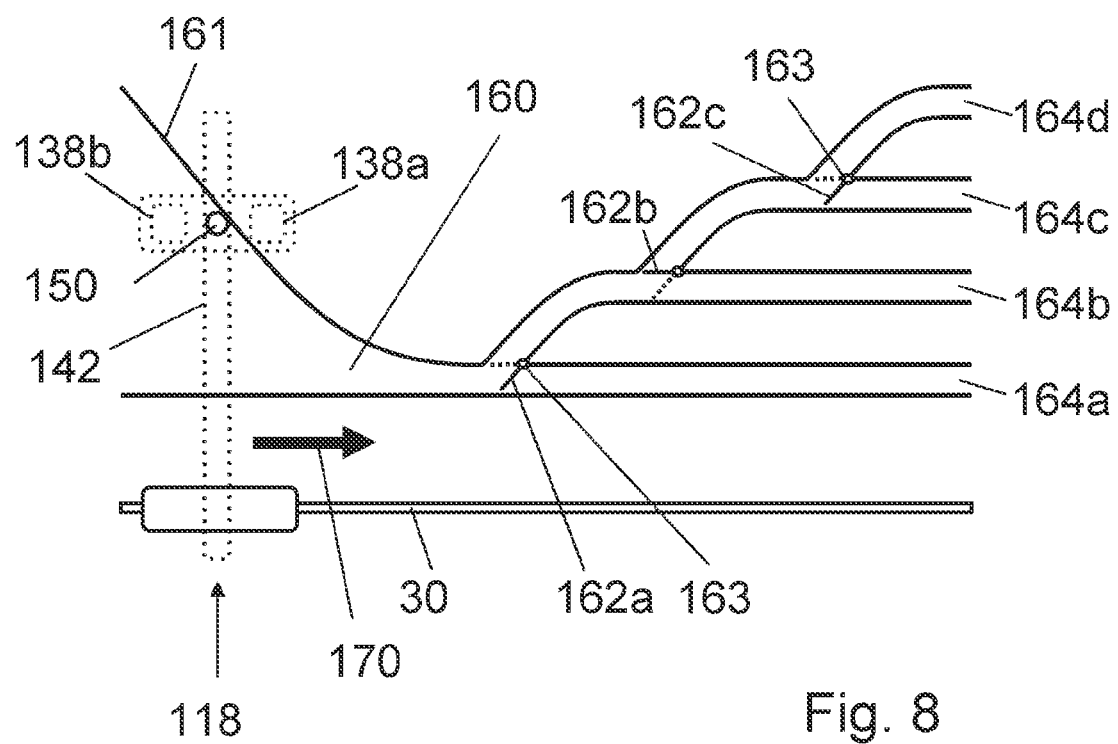
FIG. 8 shows, schematically, a lateral side view of a slotted guide for setting a height of the upper gripper tongs of the mover from FIGS. 7a to 7d.

An example for a slotted guide 160 for the height-adjustment of the upper gripper tongs 138 of the carriage 118 is illustrated in FIG. 8.

The upper gripper tongs 138 comprising the gripper arms 138a, 138b can be height-adjusted in this case. The gripper of the carriage 118 can thus be dynamically adapted to different bottle sizes.

In the shown embodiment, the upper gripper tongs 138 and the lower gripper tongs have common axes of rotation 141a, 141b. In a modification, separate axes of rotation can be provided for the lower grippers (not shown). For example, the axes of rotation of the lower gripper tongs can be arranged slightly further apart than the axes of rotation 141a, 141b of the upper gripper tongs 138, because bottles typically have a larger diameter in a lower quarter than in an upper quarter.

The lower gripper tongs preferably in each case grip the bottle in a lower quarter of the bottle, and the upper gripper tongs 138 in an upper quarter.

In FIG. 7a, the carriage 118 guides a bottle of the first bottle type 2, in FIG. 7b a bottle of the second bottle type 3, and in FIGS. 7c and 7d a bottle of the third bottle type 4. It goes without saying that the carriage 118 can also guide bottles of the fourth bottle type 5, even though this is not separately illustrated.

In contrast to the above-described carriages 18, 19, and 27, the carriage 118 itself does not have a platform. Instead, the bottles are shifted through the carriage 118 so as to stand on a sliding surface 140. The carriage 118 as such does not have to carry the weight of the bottle transported therein. The sliding surface 140 can be considered to be part of the rail system.

For example, the sorter 36, the removal means 31, and/or the removal means 31a can in each case have one or several of the carriages 118.

The carriage 118 or the carriages 118, respectively, are configured for the floor-guided transport of bottles flush with the floor. As can be seen from FIGS. 7a to 7c, the bottles of the different bottle types 2, 3, and 4 are guided flush with the floor in the carriage 118 or are transported through the carriage 118, respectively. The same also applies for the fourth bottle type 5.

Similarly as for FIGS. 2a and 2b, different, bottle-adapted carriages can also be provided for the different bottle types 2, 3, 4, 5 for transporting the bottles flush with the floor, which are similar to the carriage 118, but in the case of which the upper gripper tongs are not height-adjustable at all or can only be height-adjusted manually. For adaptation to the different bottle types 2, 3, 4, 5, the upper gripper tongs of the different carriages are then firmly set to different heights. It goes without saying that, for example, universal carriages 118 and such bottle-adapted carriages can be used simultaneously for the transport flush with the floor in the same sorter 36, removal system 31, and/or removal system 31a.

FIG. 8 shows in a schematic manner a slotted guide 160 for setting the height of the upper gripper tongs 138 of the carriages 118. When one of the carriages 118 passes through the slotted guide 160 along a drive-through direction 170, its engageable element 150 engages with the slotted guide 160. Along a drive-through direction 170, the slotted guide 160 initially has a reset region 161. The height of the upper gripper tongs 138 is thus brought to a standard height. It goes without saying that if the height already corresponds to the standard height, it is not changed at this spot.

Further back, along the drive-through direction 170, the slotted guide 160 branches into several height setting lanes. In this case, the slotted guide 160 has four height setting lanes 164a to 164d. The height setting lanes 164a to 164d correspond to different height settings of the upper gripper tongs 138 comprising the upper gripper arms 138a, 138b.

Viewed in more detail, a first branching, at which a second height setting lane 164b branches off from a first height setting lane 164, initially follows the reset region 161. At the branching, a first flap 162a for changing the direction for the engageable element 150 is provided. The first flap 162a is pivotably attached to a rotary support 163. The first flap 162a can be pivoted between a first position and a second position by means of a motor. In the first position, it blocks the branching to the second height setting lane 164b and releases an end region of the first height setting lane 164a. This first position of the first flap 162a is illustrated in FIG. 8 by means of a dashed line. In the second position, which is illustrated in FIG. 8 by means of the solid line, the first flap 162a blocks the end region of the first height setting lane 164a and releases the branching to the second height setting lane 164b.

When the engageable element 150 reaches the first flap 162a, while the first flap 162a is in its first position, the first flap 162a does not deflect the engageable element 150. The engageable element 150 is guided through the end region of the first height setting lane 164a. The engageable element 150 and the upper gripper tongs 138 remain at the standard height. The slotted guide 160 thus adjusts the upper gripper tongs 138 to a first height (the standard height) in this case, for example for the first bottle type 2.

When the engageable element 150 reaches the first flap 162a, while the first flap 162a is in its second position, the first flap 162a deflects the engageable element 150 into the second height setting lane 164b. The engageable element 150 and thus also the upper gripper tongs 138 are thus shifted upwards. The upper gripper tongs 138 are thus set to a second height, which is larger than the first height, for example for the second bottle type 3.

Shortly after its beginning, a second branching follows in the second height setting lane 164b, at which a third height setting lane 164c branches off from the second height setting lane 164b. A second flap 162b for changing the direction for the engageable element 150, which is constructed and works like the first flap 162a, is attached to the second branching. In a first position, the second flap 162b blocks the branching to the third height setting lane 164c and releases an end region of the second height setting lane 164b. This first position of the second flap 162b is illustrated in FIG. 8 by means of a dashed line. In its second position, which is illustrated in FIG. 8 by means of the solid line, the second flap 162b blocks the end region of the second height setting lane 164b and guides the engageable element into the third height setting lane 164c at the second branching. The second flap 162b is thus configured to optionally guide the engageable element 150 into the end region of the second height setting lane 164b or into the third height setting lane 164c. The upper gripper tongs 138 can thus optionally be set to the second height or to a third height, which corresponds to the third height setting lane 164c and which is suitable for the third bottle type 4.

A third branching to a fourth height setting line 164d therefore takes place in the third height setting lane 164c. The third branching has a third flap 162c, which is constructed and works like the first flap 162a and the second flap 162b. The upper gripper tongs 138 can thus optionally be set to the third height or to a fourth height, which corresponds to the fourth height setting lane 164d and which is suitable for the fourth bottle type 5.

In this example, the slotted guide 160 can optionally set the upper gripper tongs 138 of the carriages 118 to one of four different heights, wherein each of these heights corresponds to a different one of the four bottle types 2, 3, 4, 5. In other further developments, the slotted guide can have more or fewer height setting lanes. Moreover, the standard height can correspond, for example, to the largest height, instead of to the lowest, as is the case in FIG. 8.

Such a slotted guide 160 can be provided, for example, in the mixed rail region 30 and/or in the removal system 31 in FIG. 1.

Preferably, the control system 100 is connected to the slotted guide 160 and is configured to control the slotted guide 160. The control system 100 in particular controls the motors for pivoting the flaps 162a, 162b, and 162c.

In another modification, the carriages 118 in each case have a motor for setting the height of the upper gripper tongs 138.

The present invention provides for a flexible filling as required of bottles of different bottle types in a production line. Different products can be completed in arbitrary order and in arbitrary shares in the same production line in mixed mode operation. This ensure a reduction of the required storage areas, of the energy consumption, of the $CO_2$ equivalent, and of the costs.

TABLE OF REFERENCE NUMERALS 1, 101 filler carousel
2 first bottle type
3 second bottle type
4 third bottle type
5 fourth bottle type
6 infeed conveyor first bottle type
7 infeed conveyor second bottle type
8 infeed conveyor third bottle type
9 infeed conveyor fourth bottle type
10 allocating screw first bottle type
11 allocating screw second bottle type
12 allocating screw third bottle type
13 allocating screw fourth bottle type
14 accelerating section first bottle type
15 accelerating section second bottle type
16 accelerating section third bottle type
17 accelerating section fourth bottle type
18 carriage comprising gripper first bottle type
19 carriage comprising gripper second bottle type
20 carriage comprising gripper third bottle type
21 carriage comprising gripper fourth bottle type
22 unmixed rail region first bottle type
23 unmixed rail region second bottle type
24 unmixed rail region third bottle type
25 unmixed rail region fourth bottle type
26 linear conveyor
27 carriage comprising gripper for different bottle types
28 waiting and buffer positions upstream of filler
29 filling position
30 mixed rail region
31, 31a removal means
32 capper carousel
33 outfeed star
34 transport belt for full bottles
35 supply line
36 sorter
37 gripper
38a, 138a first gripper arm upper gripper tongs
38b, 138b second gripper arm upper gripper tongs
39a, 139a first gripper arm lower gripper tongs
39b, 139b second gripper arm lower gripper tongs
40 floor support for bottle
41a, 141a drive axis first gripper arms
41b, 141b drive axis second gripper arms
42, 142 rail for height adjustment
43 flat opening height
48 infeed switch first bottle type
49 infeed switch second bottle type
50 infeed switch third bottle type
51 infeed switch fourth bottle type
52 buffer section upstream of filler
53 return switch first bottle type
54 return switch second bottle type
55 return switch third bottle type
56 return switch fourth bottle type
57 buffer region first bottle type
58 buffer region second bottle type
59 buffer region third bottle type
60 buffer region fourth bottle type
63 annular vessel base beverage
64 rotary feedthrough base beverage
65 infeed valve first flavoring
66 infeed valve second flavoring
67 infeed valve third flavoring
68 infeed valve fourth flavoring
69 rotary feedthrough first flavoring
70 rotary feedthrough second flavoring
71 rotary feedthrough third flavoring
72 rotary feedthrough fourth flavoring
73 annular vessel first flavoring
74 annular vessel second flavoring
75 annular vessel third flavoring
76 annular vessel fourth flavoring
77 filling pipe
78 bottle centering cone with seal
79 base plate
80 height adjustment by means of servo motor
81 central axis filler carousel
82 ventilation
89 transfer star
90, 190 decorating system
91 treating position
100 control system
118 carriage
138 upper gripper tongs
140 sliding surface
150 engageable element
160 slotted guide
161 reset region
162a first flap
162b second flap
162c third flap
163 rotary support
164a first height setting lane
164b second height setting lane
164c third height setting lane
164d fourth height setting lane

What is claimed is:

1. A method for feeding bottles as required into a bottle treating device of a filling plant, wherein, by means of a sorter,
bottles of a first bottle type are removed from a first supply line and
at least bottles of a first further bottle type, are removed from a first further supply line,
wherein the first further bottle type differs in at least one of shape and size from the first bottle type, wherein the sorter lines up the bottles on an infeed section in a predetermined order, wherein the bottles are fed from the infeed section in the predetermined order to the bottle treating device, wherein the predetermined order can be selected freely, wherein the sorter has several movers, which are driven independently and individually, wherein the bottle treating device is formed as a carousel device, wherein the filling plant has a removal system for removing the bottles from the bottle treating device, wherein a number of cycles in the bottle treating device is controlled individually for each bottle, and wherein each mover has a gripper for at least one of removing a bottle from the supply lines and feeding the bottle into the bottle treating device.

2. The method according to claim 1, wherein the predetermined order is determined based on a freely selectable outlet order, in which the bottles, the treatment of which has finished, are to leave the filling plant, wherein different treatment durations for different bottles are considered in the filling plant when determining the predetermined order.

3. A filling plant for treating bottles as required, having:
at least one bottle treating device;
a first supply line, which supplies a first bottle type;
at least one further supply line, which supplies a further bottle type, wherein the further bottle type differs in at least one of shape or size from the first bottle type; and
a sorter, which is configured to remove bottles selectively arbitrarily from each of the supply lines, and to line up the bottles arranged in a predetermined order on an infeed section, and to feed the bottles to the bottle treating device in the predetermined order,
wherein the sorter is configured such that the predetermined order is chosen freely, and
wherein the sorter has several movers, which are driven independently and individually,
wherein the at least one bottle treating device is formed as a carousel device,
wherein the filling plant has a removal system for removing the bottles from the at least one bottle treating device,
wherein a number of cycles in the at least one bottle treating device controllable individually for each bottle, and
wherein each mover has a gripper for at least one of removing a bottle from the supply lines or feeding the bottle into the at least one bottle treating device.

4. The filling plant according to claim 3, further comprising a control system, which is configured to determine the predetermined order based on a freely-selectable outlet order, in which the bottles, the treatment of which has finished, are to leave the filling plant, and wherein the control system is configured to consider different treatment durations for different bottles in the filling plant when determining the predetermined order.

5. The filling plant according to claim 3, wherein the at least one bottle treating device has several treating positions for treating a respective bottle, wherein the individual treating positions are embodied universally for receiving all different bottle types, and wherein the sorter is configured to feed the bottles from the infeed section to individual treating positions of the at least one bottle treating device in the predetermined order.

6. The filling plant according to claim 3, wherein the sorter has a first unmixed rail region, which is arranged at the first supply line and which is assigned to the first supply line, and has at least one first further unmixed rail region, which is arranged at the at least one further supply line and which is assigned to the at least one further supply line, in such a way that a mover can take over the bottles from the respective supply line in the respective rail region.

7. The filling plant according to claim 6, wherein the mover is configured to change from the respective unmixed rail region via a switch to the infeed section, which has a mixed rail region, which is a rail region on which different bottle types are transported at the same time;
wherein the mixed rail region meshes with the at least one bottle treating device at least in a subregion, in which bottles are transferred to the at least one bottle treating device.

8. The filling plant according to claim 3, wherein that the gripper has first gripper tongs comprising two opposing gripper arms, which are configured to be moved towards one another for closing the gripper, and wherein the gripper has second height-adjustable gripper tongs, which are arranged above or below the first gripper tongs.

9. The filling plant according to claim 3, wherein the filling plant has a filler carousel comprising several filling positions.

10. The filling plant according to claim 9, wherein the filler carousel is the at least one bottle treating device.

11. The filling plant according to claim 10, wherein the filler carousel has a beverage supply for at least one base beverage and at least one mixing beverage, wherein the filler carousel is configured to mix a beverage, individually for each bottle from the base beverage and the mixing beverage, and to fill it into a bottle in the filling position.

12. The filling plant according to claim 11, wherein the filler carousel comprises at least one annular vessel for the base beverage and, for each of the several filling positions, respectively, one filling outlet with a main line extending from the at least one annular vessel for the base beverage a respective regulatable valve and at least one smaller secondary line for the mixing beverage with a respective regulatable valve, the secondary line leading into the main line,
wherein the filling plant is configured to control the filling in such a way by means of the regulatable valves that the base beverage and the mixing beverage are fed in a time sequence, wherein the filling is finished with the base beverage without mixing beverage.

13. The filling plant according claim 3, further comprising a decorating system for decorating the bottles, which is configured to selectively and individually decorate the bottles independently of the order thereof, at least depending on one of the bottle type of the respective bottle and a filling, with which the respective bottle is being filled.

14. The filling plant according to claim 3, wherein the control of the filling plant for at least one of
mechanical settings thereof or
settings thereof for the mixtures of the filling material takes place by means of individual codes, which are applied to the bottles and which are detected by means of at least one reader.

* * * * *